(12) United States Patent
Chen et al.

(10) Patent No.: US 9,706,090 B2
(45) Date of Patent: Jul. 11, 2017

(54) IMAGING LENS, AND ELECTRONIC APPARATUS INCLUDING THE SAME

(71) Applicant: Genius Electronic Optical Co., Ltd., Taichung (TW)

(72) Inventors: Shih-Han Chen, Taichung (TW); Jia-Sin Jhang, Taichung (TW); Guan-Ning Huang, Taichung (TW)

(73) Assignee: Genius Electronic Optical Co., Ltd., Taichung (TW)

( * ) Notice: Subject to any disclaimer, the term of this patent is extended or adjusted under 35 U.S.C. 154(b) by 508 days.

(21) Appl. No.: 14/138,322

(22) Filed: Dec. 23, 2013

(65) Prior Publication Data

US 2015/0062405 A1 Mar. 5, 2015

(30) Foreign Application Priority Data

Aug. 29, 2013 (CN) .......................... 2013 1 0385034

(51) Int. Cl.
| | | |
|---|---|---|
| *G02B 13/18* | (2006.01) | |
| *G02B 9/62* | (2006.01) | |
| *H04N 5/225* | (2006.01) | |
| *G02B 13/00* | (2006.01) | |

(52) U.S. Cl.
CPC ....... *H04N 5/2254* (2013.01); *G02B 13/0045* (2013.01)

(58) Field of Classification Search
CPC ....... G02B 13/0045; G02B 9/62; G02B 13/18
USPC ........................ 359/713, 756, 757
See application file for complete search history.

(56) References Cited

U.S. PATENT DOCUMENTS

| | | |
|---|---|---|
| 6,972,908 B2 | 12/2005 | Noda |
| 6,994,668 B2 | 2/2006 | Miyano |
| 6,995,925 B2 | 2/2006 | Noda |
| 7,006,300 B2 | 2/2006 | Shinohara |
| 7,164,539 B2 | 1/2007 | Tomioka |
| 7,230,776 B2 | 6/2007 | Yamamoto |
| 7,724,446 B2 | 5/2010 | Chang |
| 8,355,215 B2 | 1/2013 | Asami |
| 8,379,323 B2 | 2/2013 | Huang et al. |
| 8,385,006 B2 | 2/2013 | Tsai et al. |
| 8,432,619 B2 | 4/2013 | Huang |
| 8,472,128 B2 | 6/2013 | Huang |
| 8,477,431 B2 | 7/2013 | Huang |

(Continued)

FOREIGN PATENT DOCUMENTS

| | | |
|---|---|---|
| TW | 201239445 | 10/2012 |
| TW | 201239445 A | 10/2012 |

(Continued)

OTHER PUBLICATIONS

Search report appended in an Office Action issued to Taiwanese counterpart application No. 102132768 by the Taiwan Intellectual Property Office on Sep. 1, 2014 along with an English translation thereof.

(Continued)

*Primary Examiner* — Scott J Sugarman
(74) *Attorney, Agent, or Firm* — Jianq Chyun IP Office

(57) ABSTRACT

An imaging lens includes first to sixth lens elements arranged from an object side to an image side in the given order. Through designs of surfaces of the lens elements and relevant optical parameters, a short system length of the imaging lens may be achieved while maintaining good optical performance.

15 Claims, 36 Drawing Sheets

(56) References Cited

U.S. PATENT DOCUMENTS

| | | |
|---|---|---|
| 8,514,499 B2 | 8/2013 | Hsu et al. |
| 2012/0188654 A1* | 7/2012 | Huang ............... G02B 9/62 359/713 |
| 2012/0194726 A1* | 8/2012 | Huang ............ G02B 13/0045 348/340 |
| 2012/0206822 A1 | 8/2012 | Hsieh et al. |
| 2012/0243108 A1* | 9/2012 | Tsai .................. G02B 13/18 359/713 |
| 2013/0003193 A1* | 1/2013 | Huang ............ G02B 13/0045 359/713 |
| 2014/0063323 A1* | 3/2014 | Yamazaki .......... G02B 13/18 348/335 |
| 2014/0153113 A1* | 6/2014 | Tsai .................. G02B 13/18 359/713 |

FOREIGN PATENT DOCUMENTS

| | | |
|---|---|---|
| TW | 201312155 | 3/2013 |
| TW | 201312155 A1 | 3/2013 |

OTHER PUBLICATIONS

"Office Action of Taiwan Counterpart Application", issued on Dec. 27, 2016, p. 1-p. 5.

* cited by examiner system focal length =3.977 mm, half field-of-view =37.807°, F-number =2.022, system length =5.502mm

| lens element | surface | radius of curvature | thickness | refractive index | Abbe number | focal length | material |
|---|---|---|---|---|---|---|---|
| object | | ∞ | ∞ | | | | |
| aperture stop 2 | | ∞ | -0.120 | | | | |
| first lens element 3 | object-side surface 31 | 2.548 | 0.620 | 1.544 | 56.114 | 3.392 | plastic |
| | image-side surface 32 | -6.196 | 0.089 | | | | |
| second lens element 4 | object-side surface 41 | -3.317 | 0.314 | 1.544 | 56.114 | 14.786 | plastic |
| | image-side surface 42 | -2.429 | 0.067 | | | | |
| third lens element 5 | object-side surface 51 | -100.001 | 0.339 | 1.640 | 23.265 | -4.815 | plastic |
| | image-side surface 52 | 3.207 | 0.692 | | | | |
| fourth lens element 6 | object-side surface 61 | -3.673 | 0.867 | 1.544 | 56.114 | 2.612 | plastic |
| | image-side surface 62 | -1.113 | 0.043 | | | | |
| fifth lens element 7 | object-side surface 71 | -5.605 | 0.600 | 1.544 | 56.114 | 6.400 | plastic |
| | image-side surface 72 | -2.234 | 0.054 | | | | |
| sixth lens element 8 | object-side surface 81 | -4.768 | 0.481 | 1.544 | 56.114 | -1.806 | plastic |
| | image-side surface 82 | 1.288 | 0.500 | | | | |
| optical filter 9 | object-side surface 91 | ∞ | 0.300 | | | | |
| | image-side surface 92 | ∞ | 0.538 | | | | |
| image plane 100 | | ∞ | | | | | |

FIG.3

| surface | 31 | 32 | 41 | 42 | 51 | 52 |
|---|---|---|---|---|---|---|
| K | 0.00000E+00 | 0.00000E+00 | 4.80554E+00 | -9.54383E+00 | 0.00000E+00 | 4.10138E+00 |
| a4 | -3.40500E-02 | -8.04200E-02 | 1.51330E-02 | 1.36990E-02 | -3.26900E-02 | -7.93300E-02 |
| a6 | -3.78000E-03 | 4.74940E-02 | 9.89940E-02 | 8.38200E-03 | -5.42200E-02 | 4.40600E-03 |
| a8 | -3.55100E-02 | -3.15400E-02 | -2.17800E-02 | 3.87000E-04 | 3.62810E-02 | 1.38100E-03 |
| a10 | 0.00000E+00 | 0.00000E+00 | 0.00000E+00 | 0.00000E+00 | 0.00000E+00 | 0.00000E+00 |
| a12 | 0.00000E+00 | 0.00000E+00 | 0.00000E+00 | 0.00000E+00 | 0.00000E+00 | 0.00000E+00 |
| a14 | 0.00000E+00 | 0.00000E+00 | 0.00000E+00 | 0.00000E+00 | 0.00000E+00 | 0.00000E+00 |
| a16 | 0.00000E+00 | 0.00000E+00 | 0.00000E+00 | 0.00000E+00 | 0.00000E+00 | 0.00000E+00 |
| a18 | 0.00000E+00 | 0.00000E+00 | 0.00000E+00 | 0.00000E+00 | 0.00000E+00 | 0.00000E+00 |
| surface | 61 | 62 | 71 | 72 | 81 | 82 |
| K | 0.00000E+00 | -4.08153E+00 | 0.00000E+00 | 0.00000E+00 | 0.00000E+00 | -5.77649E+00 |
| a4 | 8.98000E-04 | -5.63800E-02 | 8.35800E-02 | 1.20407E-01 | 1.12980E-02 | -5.43200E-02 |
| a6 | -9.74000E-05 | 2.14530E-02 | -4.65100E-02 | -2.27600E-02 | -3.84000E-03 | 1.96740E-02 |
| a8 | -5.92000E-03 | -9.98000E-03 | 1.46720E-02 | 1.08000E-04 | 2.41000E-03 | -5.12000E-03 |
| a10 | 2.34000E-03 | 3.46800E-03 | -3.84000E-03 | 2.73000E-04 | -3.00000E-04 | 6.61000E-04 |
| a12 | 0.00000E+00 | 0.00000E+00 | 3.18000E-04 | 6.38000E-06 | -2.40000E-05 | -9.17000E-06 |
| a14 | 0.00000E+00 | 0.00000E+00 | 0.00000E+00 | 0.00000E+00 | 7.05000E-06 | -5.28000E-06 |
| a16 | 0.00000E+00 | 0.00000E+00 | 0.00000E+00 | 0.00000E+00 | -3.85000E-07 | 3.20000E-07 |
| a18 | 0.00000E+00 | 0.00000E+00 | 0.00000E+00 | 0.00000E+00 | 0.00000E+00 | 0.00000E+00 |

| system focal length =4.173mm, half field-of-view =36.616°, F-number =2.044, system length =5.531mm | | | | | | |
|---|---|---|---|---|---|---|
| lens element | surface | radius of curvature | thickness | refractive index | Abbe number | focal length | material |
| object | | ∞ | ∞ | | | | |
| aperture stop 2 | | ∞ | -0.120 | | | | |
| first lens element 3 | object-side surface 31 | 2.445 | 0.592 | 1.544 | 56.114 | 3.414 | plastic |
| | image-side surface 32 | -7.170 | 0.106 | | | | |
| second lens element 4 | object-side surface 41 | -3.317 | 0.424 | 1.544 | 56.114 | 16.405 | plastic |
| | image-side surface 42 | -2.530 | 0.040 | | | | |
| third lens element 5 | object-side surface 51 | -64.554 | 0.361 | 1.640 | 23.265 | -4.745 | plastic |
| | image-side surface 52 | 3.218 | 0.913 | | | | |
| fourth lens element 6 | object-side surface 61 | -2.546 | 0.285 | 1.544 | 56.114 | 3.367 | plastic |
| | image-side surface 62 | -1.110 | 0.040 | | | | |
| fifth lens element 7 | object-side surface 71 | -5.960 | 0.792 | 1.544 | 56.114 | 6.253 | plastic |
| | image-side surface 72 | -2.272 | 0.040 | | | | |
| sixth lens element 8 | object-side surface 81 | -7.187 | 0.569 | 1.544 | 56.114 | -2.118 | plastic |
| | image-side surface 82 | 1.416 | 0.500 | | | | |
| optical filter 9 | object-side surface 91 | ∞ | 0.300 | | | | |
| | image-side surface 92 | ∞ | 0.569 | | | | |
| image plane 100 | | ∞ | | | | | |

| surface | 31 | 32 | 41 | 42 | 51 | 52 |
|---|---|---|---|---|---|---|
| K | 0.00000E+00 | 0.00000E+00 | 5.41920E+00 | -1.64280E+01 | 0.00000E+00 | 3.83630E+00 |
| a4 | -2.98560E-02 | -8.11964E-02 | 2.94833E-02 | 1.32713E-02 | -3.93771E-02 | -1.02318E-01 |
| a6 | -8.39129E-03 | 5.78069E-02 | 1.02585E-01 | 1.12011E-02 | -7.29842E-02 | -2.34635E-03 |
| a8 | -2.70290E-02 | -3.35342E-02 | -3.04677E-02 | -1.71857E-02 | 3.99150E-02 | 5.39353E-03 |
| a10 | 0.00000E+00 | 0.00000E+00 | 0.00000E+00 | 0.00000E+00 | 0.00000E+00 | 0.00000E+00 |
| a12 | 0.00000E+00 | 0.00000E+00 | 0.00000E+00 | 0.00000E+00 | 0.00000E+00 | 0.00000E+00 |
| a14 | 0.00000E+00 | 0.00000E+00 | 0.00000E+00 | 0.00000E+00 | 0.00000E+00 | 0.00000E+00 |
| a16 | 0.00000E+00 | 0.00000E+00 | 0.00000E+00 | 0.00000E+00 | 0.00000E+00 | 0.00000E+00 |
| a18 | 0.00000E+00 | 0.00000E+00 | 0.00000E+00 | 0.00000E+00 | 0.00000E+00 | 0.00000E+00 |
| surface | 61 | 62 | 71 | 72 | 81 | 82 |
| K | 0.00000E+00 | -3.77534E+00 | 0.00000E+00 | 0.00000E+00 | 0.00000E+00 | -5.53222E+00 |
| a4 | 5.53753E-03 | -5.31070E-02 | 1.06672E-01 | 1.20996E-01 | 9.51831E-03 | -5.49282E-02 |
| a6 | 4.05708E-03 | 2.64270E-02 | -5.46878E-02 | -1.87897E-02 | -4.87051E-03 | 1.98144E-02 |
| a8 | -6.65565E-03 | -7.58725E-03 | 1.87522E-02 | -2.98252E-04 | 2.35893E-03 | -5.15932E-03 |
| a10 | -2.42584E-04 | 3.74629E-03 | -4.42621E-03 | 2.39575E-04 | -2.63668E-04 | 6.61951E-04 |
| a12 | 0.00000E+00 | 0.00000E+00 | 3.47058E-04 | 5.30895E-07 | -2.37964E-05 | -7.31787E-06 |
| a14 | 0.00000E+00 | 0.00000E+00 | 0.00000E+00 | 0.00000E+00 | 6.88131E-06 | -5.08374E-06 |
| a16 | 0.00000E+00 | 0.00000E+00 | 0.00000E+00 | 0.00000E+00 | -4.08981E-07 | 2.81532E-07 |
| a18 | 0.00000E+00 | 0.00000E+00 | 0.00000E+00 | 0.00000E+00 | 0.00000E+00 | 0.00000E+00 |

FIG.8

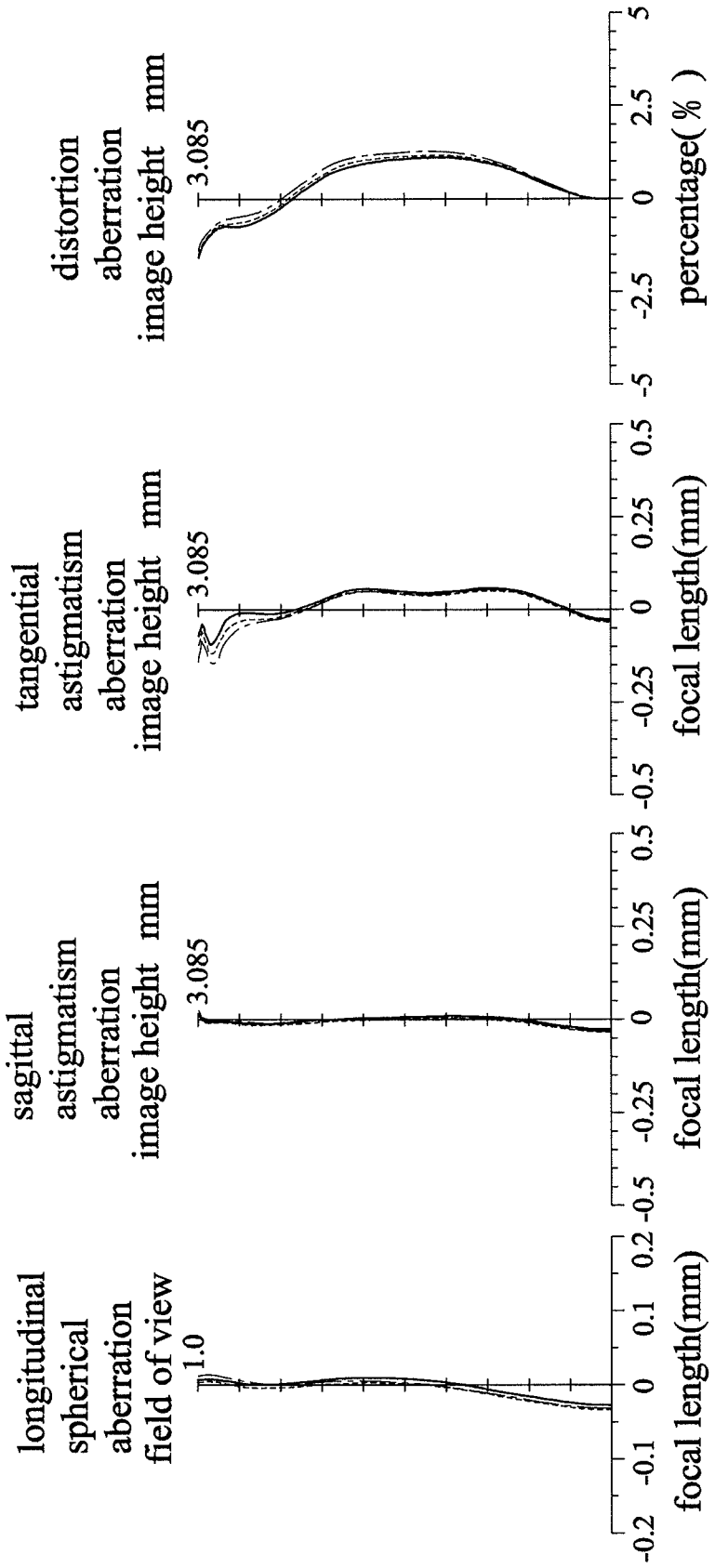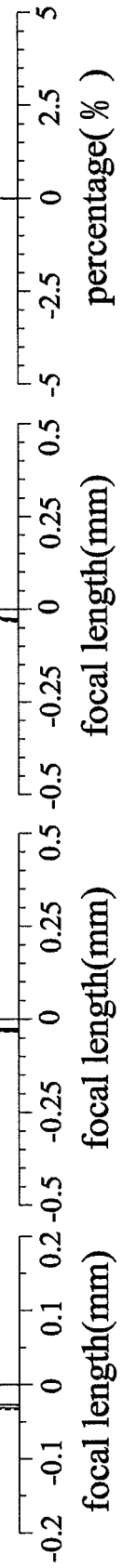

system focal length =4.0248mm , half field-of-view =37.533°, F-number =2.02, system length =5.420mm

| lens element | surface | radius of curvature | thickness | refractive index | Abbe number | focal length | material |
|---|---|---|---|---|---|---|---|
| object | | ∞ | ∞ | | | | |
| aperture stop 2 | | ∞ | -0.120 | | | | |
| first lens element 3 | object-side surface 31 | 2.515 | 0.531 | 1.544 | 56.114 | 3.665 | plastic |
| | image-side surface 32 | -9.055 | 0.108 | | | | |
| second lens element 4 | object-side surface 41 | -3.197 | 0.328 | 1.544 | 56.114 | 19.101 | plastic |
| | image-side surface 42 | -2.536 | 0.144 | | | | |
| third lens element 5 | object-side surface 51 | -63.904 | 0.359 | 1.640 | 23.265 | -4.718 | plastic |
| | image-side surface 52 | 3.200 | 0.568 | | | | |
| fourth lens element 6 | object-side surface 61 | -9.815 | 0.989 | 1.544 | 56.114 | 3.095 | plastic |
| | image-side surface 62 | -1.493 | 0.499 | | | | |
| fifth lens element 7 | object-side surface 71 | -5.502 | 0.270 | 1.544 | 56.114 | 7.084 | plastic |
| | image-side surface 72 | -2.310 | 0.212 | | | | |
| sixth lens element 8 | object-side surface 81 | -3.012 | 0.230 | 1.544 | 56.114 | -2.131 | plastic |
| | image-side surface 82 | 1.947 | 0.500 | | | | |
| optical filter 9 | object-side surface 91 | ∞ | 0.300 | | | | |
| | image-side surface 92 | ∞ | 0.381 | | | | |
| image plane 100 | | ∞ | | | | | |

FIG.11

| surface | 31 | 32 | 41 | 42 | 51 | 52 |
|---|---|---|---|---|---|---|
| K | 0.00000E+00 | 0.00000E+00 | 4.54073E+00 | -1.13980E+01 | 0.00000E+00 | -3.22713E+00 |
| a4 | -3.54073E-02 | -8.82825E-02 | 2.75603E-02 | 2.21663E-02 | -4.27956E-02 | -8.42718E-02 |
| a6 | -3.34720E-03 | 5.48915E-02 | 9.87450E-02 | 1.36877E-02 | -5.64948E-02 | -2.22928E-03 |
| a8 | -3.67128E-02 | -3.51395E-02 | -2.71527E-02 | -1.65138E-02 | 3.11106E-02 | 6.51375E-03 |
| a10 | 0.00000E+00 | 0.00000E+00 | 0.00000E+00 | 0.00000E+00 | 0.00000E+00 | 0.00000E+00 |
| a12 | 0.00000E+00 | 0.00000E+00 | 0.00000E+00 | 0.00000E+00 | 0.00000E+00 | 0.00000E+00 |
| a14 | 0.00000E+00 | 0.00000E+00 | 0.00000E+00 | 0.00000E+00 | 0.00000E+00 | 0.00000E+00 |
| a16 | 0.00000E+00 | 0.00000E+00 | 0.00000E+00 | 0.00000E+00 | 0.00000E+00 | 0.00000E+00 |
| a18 | 0.00000E+00 | 0.00000E+00 | 0.00000E+00 | 0.00000E+00 | 0.00000E+00 | 0.00000E+00 |
| surface | 61 | 62 | 71 | 72 | 81 | 82 |
| K | 0.00000E+00 | -4.98341E+00 | 0.00000E+00 | 0.00000E+00 | 0.00000E+00 | -6.90580E+00 |
| a4 | -2.26241E-03 | -7.74710E-02 | 8.66183E-02 | 1.53942E-01 | 1.69799E-02 | -4.99750E-02 |
| a6 | -1.19684E-02 | 2.60479E-02 | -3.51615E-02 | -3.77923E-02 | -2.33077E-03 | 1.81827E-02 |
| a8 | -5.83517E-03 | -1.03661E-02 | -3.09598E-04 | 5.88216E-04 | 2.31983E-03 | -5.17485E-03 |
| a10 | 5.28052E-04 | 1.28615E-03 | 1.34012E-03 | 4.73299E-04 | -3.02967E-04 | 6.88680E-04 |
| a12 | 0.00000E+00 | 0.00000E+00 | -3.71934E-04 | 5.78858E-05 | -2.34796E-05 | -7.48652E-06 |
| a14 | 0.00000E+00 | 0.00000E+00 | 0.00000E+00 | 0.00000E+00 | 7.02793E-06 | -5.32313E-06 |
| a16 | 0.00000E+00 | 0.00000E+00 | 0.00000E+00 | 0.00000E+00 | -3.72426E-07 | 2.92664E-07 |
| a18 | 0.00000E+00 | 0.00000E+00 | 0.00000E+00 | 0.00000E+00 | 0.00000E+00 | 0.00000E+00 |

FIG.12 system focal length =3.931mm, half field-of-view =38.127°, F-number =2.004, system length =5.309mm

| lens element | surface | radius of curvature | thickness | refractive index | Abbe number | focal length | material |
|---|---|---|---|---|---|---|---|
| object | | ∞ | ∞ | | | | |
| aperture stop 2 | | ∞ | -0.120 | | | | |
| first lens element 3 | object-side surface 31 | 2.391 | 0.551 | 1.544 | 56.114 | 3.427 | plastic |
| | image-side surface 32 | -7.898 | 0.106 | | | | |
| second lens element 4 | object-side surface 41 | -3.275 | 0.395 | 1.544 | 56.114 | 13.450 | plastic |
| | image-side surface 42 | -2.361 | 0.068 | | | | |
| third lens element 5 | object-side surface 51 | 70.330 | 0.289 | 1.640 | 23.265 | -5.063 | plastic |
| | image-side surface 52 | 3.114 | 0.740 | | | | |
| fourth lens element 6 | object-side surface 61 | -3.176 | 0.697 | 1.544 | 56.114 | 2.668 | plastic |
| | image-side surface 62 | -1.076 | 0.040 | | | | |
| fifth lens element 7 | object-side surface 71 | -5.943 | 0.588 | 1.544 | 56.114 | 6.377 | plastic |
| | image-side surface 72 | -2.272 | 0.040 | | | | |
| sixth lens element 8 | object-side surface 81 | -5.186 | 0.478 | 1.544 | 56.114 | -1.795 | plastic |
| | image-side surface 82 | 1.247 | 0.500 | | | | |
| optical filter 9 | object-side surface 91 | ∞ | 0.300 | | | | |
| | image-side surface 92 | ∞ | 0.518 | | | | |
| image plane 100 | | ∞ | | | | | |

FIG.15

| surface | 31 | 32 | 41 | 42 | 51 | 52 |
|---|---|---|---|---|---|---|
| K | 0.00000E+00 | 0.00000E+00 | 5.41692E+00 | -1.00972E+01 | 0.00000E+00 | 3.72504E+00 |
| a4 | -3.63116E-02 | -8.40299E-02 | 1.69947E-02 | 1.24370E-02 | -3.73455E-02 | -9.08500E-02 |
| a6 | -3.91724E-03 | 4.87398E-02 | 1.06442E-01 | 9.73542E-03 | -7.22859E-02 | -7.26832E-04 |
| a8 | -4.10724E-02 | -3.41191E-02 | -3.05051E-02 | -1.88164E-02 | 4.10998E-02 | 6.95559E-03 |
| a10 | 0.00000E+00 | 0.00000E+00 | 0.00000E+00 | 0.00000E+00 | 0.00000E+00 | 0.00000E+00 |
| a12 | 0.00000E+00 | 0.00000E+00 | 0.00000E+00 | 0.00000E+00 | 0.00000E+00 | 0.00000E+00 |
| a14 | 0.00000E+00 | 0.00000E+00 | 0.00000E+00 | 0.00000E+00 | 0.00000E+00 | 0.00000E+00 |
| a16 | 0.00000E+00 | 0.00000E+00 | 0.00000E+00 | 0.00000E+00 | 0.00000E+00 | 0.00000E+00 |
| a18 | 0.00000E+00 | 0.00000E+00 | 0.00000E+00 | 0.00000E+00 | 0.00000E+00 | 0.00000E+00 |
| surface | 61 | 62 | 71 | 72 | 81 | 82 |
| K | 0.00000E+00 | -3.78086E+00 | 0.00000E+00 | 0.00000E+00 | 0.00000E+00 | -5.83911E+00 |
| a4 | 8.99601E-03 | -5.68769E-02 | 7.79203E-02 | 1.21869E-01 | 1.07067E-02 | -5.43070E-02 |
| a6 | 1.92808E-03 | 2.34666E-02 | -4.47360E-02 | -2.23624E-02 | -3.96673E-03 | 1.97514E-02 |
| a8 | -5.64942E-03 | -8.97874E-03 | 1.51775E-02 | 7.32843E-06 | 2.41041E-03 | -5.17363E-03 |
| a10 | 8.53225E-04 | 3.16830E-03 | -4.13877E-03 | 2.56866E-04 | -3.04160E-04 | 6.66872E-04 |
| a12 | 0.00000E+00 | 0.00000E+00 | 3.39192E-04 | 7.82221E-06 | -2.38420E-05 | -9.01064E-06 |
| a14 | 0.00000E+00 | 0.00000E+00 | 0.00000E+00 | 0.00000E+00 | 7.05622E-06 | -5.31073E-06 |
| a16 | 0.00000E+00 | 0.00000E+00 | 0.00000E+00 | 0.00000E+00 | -3.79318E-07 | 3.21525E-07 |
| a18 | 0.00000E+00 | 0.00000E+00 | 0.00000E+00 | 0.00000E+00 | 0.00000E+00 | 0.00000E+00 |

FIG.16 system focal length =3.851mm, half field-of-view =38.705°, F-number =2.054, system length =5.312mm

| lens element | surface | radius of curvature | thickness | refractive index | Abbe number | focal length | material |
|---|---|---|---|---|---|---|---|
| object | | ∞ | ∞ | | | | |
| aperture stop 2 | | ∞ | -0.120 | | | | |
| first lens element 3 | object-side surface 31 | 2.454 | 0.533 | 1.544 | 56.114 | 3.472 | plastic |
| | image-side surface 32 | -7.691 | 0.093 | | | | |
| second lens element 4 | object-side surface 41 | -3.290 | 0.367 | 1.544 | 56.114 | 12.865 | plastic |
| | image-side surface 42 | -2.329 | 0.041 | | | | |
| third lens element 5 | object-side surface 51 | -100.000 | 0.347 | 1.640 | 23.265 | -4.726 | plastic |
| | image-side surface 52 | 3.146 | 0.741 | | | | |
| fourth lens element 6 | object-side surface 61 | -3.854 | 0.682 | 1.544 | 56.114 | 2.723 | plastic |
| | image-side surface 62 | -1.140 | 0.040 | | | | |
| fifth lens element 7 | object-side surface 71 | -5.011 | 0.291 | 1.544 | 56.114 | 8.585 | plastic |
| | image-side surface 72 | -2.471 | 0.056 | | | | |
| sixth lens element 8 | object-side surface 81 | -7.886 | 0.707 | 1.544 | 56.114 | -2.033 | plastic |
| | image-side surface 82 | 1.333 | 0.500 | | | | |
| optical filter 9 | object-side surface 91 | ∞ | 0.300 | | | | |
| | image-side surface 92 | ∞ | 0.615 | | | | |
| image plane 100 | | ∞ | | | | | |

FIG.19

| surface | 31 | 32 | 41 | 42 | 51 | 52 |
|---|---|---|---|---|---|---|
| K | 0.00000E+00 | 0.00000E+00 | 5.41449E+00 | -1.13311E+01 | 0.00000E+00 | 3.73742E+00 |
| a4 | -3.38486E-02 | -8.19988E-02 | 1.93122E-02 | 9.89011E-03 | -3.79718E-02 | -9.28108E-02 |
| a6 | -4.82725E-03 | 4.69222E-02 | 1.07372E-01 | 9.48855E-03 | -7.26602E-02 | -2.58555E-03 |
| a8 | -4.36598E-02 | -3.46622E-02 | -3.06273E-02 | -1.81627E-02 | 4.13959E-02 | 4.90530E-03 |
| a10 | 0.00000E+00 | 0.00000E+00 | 0.00000E+00 | 0.00000E+00 | 0.00000E+00 | 0.00000E+00 |
| a12 | 0.00000E+00 | 0.00000E+00 | 0.00000E+00 | 0.00000E+00 | 0.00000E+00 | 0.00000E+00 |
| a14 | 0.00000E+00 | 0.00000E+00 | 0.00000E+00 | 0.00000E+00 | 0.00000E+00 | 0.00000E+00 |
| a16 | 0.00000E+00 | 0.00000E+00 | 0.00000E+00 | 0.00000E+00 | 0.00000E+00 | 0.00000E+00 |
| a18 | 0.00000E+00 | 0.00000E+00 | 0.00000E+00 | 0.00000E+00 | 0.00000E+00 | 0.00000E+00 |
| surface | 61 | 62 | 71 | 72 | 81 | 82 |
| K | 0.00000E+00 | -4.01283E+00 | 0.00000E+00 | 0.00000E+00 | 0.00000E+00 | -5.87410E+00 |
| a4 | 1.22635E-02 | -5.36572E-02 | 8.37282E-02 | 1.19974E-01 | 8.94044E-03 | -5.03118E-02 |
| a6 | -3.19937E-04 | 2.30353E-02 | -4.32935E-02 | -2.23231E-02 | -4.26647E-03 | 1.91959E-02 |
| a8 | -7.62550E-03 | -9.26027E-03 | 1.50105E-02 | -3.00816E-05 | 2.37623E-03 | -5.20884E-03 |
| a10 | -8.02642E-04 | 3.15021E-03 | -4.01613E-03 | 2.50226E-04 | -3.05294E-04 | 6.64406E-04 |
| a12 | 0.00000E+00 | 0.00000E+00 | 4.74389E-04 | 2.44838E-05 | -2.35397E-05 | -8.94883E-06 |
| a14 | 0.00000E+00 | 0.00000E+00 | 0.00000E+00 | 0.00000E+00 | 7.14349E-06 | -5.27742E-06 |
| a16 | 0.00000E+00 | 0.00000E+00 | 0.00000E+00 | 0.00000E+00 | -3.75665E-07 | 3.18705E-07 |
| a18 | 0.00000E+00 | 0.00000E+00 | 0.00000E+00 | 0.00000E+00 | 0.00000E+00 | 0.00000E+00 |

FIG.20 system focal length =3.911mm, half field-of-view =38.320°, F-number =2.008, system length =5.353mm

| lens element | surface | radius of curvature | thickness | refractive index | Abbe number | focal length | material |
|---|---|---|---|---|---|---|---|
| object | | ∞ | ∞ | | | | |
| aperture stop 2 | | ∞ | -0.120 | | | | |
| first lens element 3 | object-side surface 31 | 2.465 | 0.553 | 1.544 | 56.114 | 3.436 | plastic |
| | image-side surface 32 | -7.235 | 0.098 | | | | |
| second lens element 4 | object-side surface 41 | -3.282 | 0.385 | 1.544 | 56.114 | 13.643 | plastic |
| | image-side surface 42 | -2.373 | 0.085 | | | | |
| third lens element 5 | object-side surface 51 | -100.000 | 0.244 | 1.640 | 23.265 | -4.796 | plastic |
| | image-side surface 52 | 3.193 | 0.765 | | | | |
| fourth lens element 6 | object-side surface 61 | -2.564 | 0.698 | 1.544 | 56.114 | 3.112 | plastic |
| | image-side surface 62 | -1.120 | 0.040 | | | | |
| fifth lens element 7 | object-side surface 71 | 24.612 | 0.598 | 1.544 | 56.114 | 3.756 | plastic |
| | image-side surface 72 | -2.218 | 0.044 | | | | |
| sixth lens element 8 | object-side surface 81 | -4.378 | 0.339 | 1.544 | 56.114 | -1.697 | plastic |
| | image-side surface 82 | 1.207 | 0.500 | | | | |
| optical filter 9 | object-side surface 91 | ∞ | 0.300 | | | | |
| | image-side surface 92 | ∞ | 0.703 | | | | |
| image plane 100 | | | | | | | |

FIG.23

| surface | 31 | 32 | 41 | 42 | 51 | 52 |
|---|---|---|---|---|---|---|
| K | 0.00000E+00 | 0.00000E+00 | 5.41241E+00 | -1.00972E+01 | 0.00000E+00 | 3.62468E+00 |
| a4 | -3.63585E-02 | -8.28683E-02 | 1.63164E-02 | 1.33310E-02 | -3.77831E-02 | -9.07426E-02 |
| a6 | -4.13884E-03 | 4.87046E-02 | 1.06451E-01 | 9.96380E-03 | -7.30803E-02 | -4.06989E-04 |
| a8 | -4.10339E-02 | -3.45825E-02 | -3.05474E-02 | -1.88034E-02 | 4.10097E-02 | 6.31485E-03 |
| a10 | 0.00000E+00 | 0.00000E+00 | 0.00000E+00 | 0.00000E+00 | 0.00000E+00 | 0.00000E+00 |
| a12 | 0.00000E+00 | 0.00000E+00 | 0.00000E+00 | 0.00000E+00 | 0.00000E+00 | 0.00000E+00 |
| a14 | 0.00000E+00 | 0.00000E+00 | 0.00000E+00 | 0.00000E+00 | 0.00000E+00 | 0.00000E+00 |
| a16 | 0.00000E+00 | 0.00000E+00 | 0.00000E+00 | 0.00000E+00 | 0.00000E+00 | 0.00000E+00 |
| a18 | 0.00000E+00 | 0.00000E+00 | 0.00000E+00 | 0.00000E+00 | 0.00000E+00 | 0.00000E+00 |
| surface | 61 | 62 | 71 | 72 | 81 | 82 |
| K | 0.00000E+00 | -4.18885E+00 | 0.00000E+00 | 0.00000E+00 | 0.00000E+00 | -5.48913E+00 |
| a4 | 3.02945E-02 | -5.87964E-02 | 5.71658E-02 | 1.27159E-01 | 1.59887E-02 | -5.44986E-02 |
| a6 | 4.25474E-04 | 2.27536E-02 | -4.10855E-02 | -2.18453E-02 | -3.89214E-03 | 2.01546E-02 |
| a8 | -6.83436E-03 | -9.01393E-03 | 1.53509E-02 | -2.57410E-04 | 2.39039E-03 | -5.17922E-03 |
| a10 | 3.82363E-04 | 3.21976E-03 | -4.08025E-03 | 2.12469E-04 | -3.06416E-04 | 6.65606E-04 |
| a12 | 0.00000E+00 | 0.00000E+00 | 3.63089E-04 | 1.51069E-05 | -2.39808E-05 | -9.13167E-06 |
| a14 | 0.00000E+00 | 0.00000E+00 | 0.00000E+00 | 0.00000E+00 | 7.06283E-06 | -5.31530E-06 |
| a16 | 0.00000E+00 | 0.00000E+00 | 0.00000E+00 | 0.00000E+00 | -3.75317E-07 | 3.21422E-07 |
| a18 | 0.00000E+00 | 0.00000E+00 | 0.00000E+00 | 0.00000E+00 | 0.00000E+00 | 0.00000E+00 |

FIG.24 system focal length =3.889mm, half field-of-view =36.710°, F-number =2.211, system length =5.301mm

| lens element | surface | radius of curvature | thickness | refractive index | Abbe number | focal length | material |
|---|---|---|---|---|---|---|---|
| object | | ∞ | ∞ | | | | |
| aperture stop 2 | | ∞ | -0.120 | | | | |
| first lens element 3 | object-side surface 31 | 2.360 | 0.429 | 1.544 | 56.114 | 4.575 | plastic |
| | image-side surface 32 | 40.003 | 0.149 | | | | |
| second lens element 4 | object-side surface 41 | -3.894 | 0.340 | 1.544 | 56.114 | 9.597 | plastic |
| | image-side surface 42 | -2.303 | 0.038 | | | | |
| third lens element 5 | object-side surface 51 | 15.506 | 0.540 | 1.640 | 23.265 | -6.180 | plastic |
| | image-side surface 52 | 3.126 | 0.912 | | | | |
| fourth lens element 6 | object-side surface 61 | -8.320 | 0.620 | 1.544 | 56.114 | 3.004 | plastic |
| | image-side surface 62 | -1.406 | 0.042 | | | | |
| fifth lens element 7 | object-side surface 71 | -6.128 | 0.597 | 1.544 | 56.114 | 6.294 | plastic |
| | image-side surface 72 | -2.277 | 0.177 | | | | |
| sixth lens element 8 | object-side surface 81 | -3.787 | 0.416 | 1.544 | 56.114 | -1.789 | plastic |
| | image-side surface 82 | 1.367 | 0.500 | | | | |
| optical filter 9 | object-side surface 91 | ∞ | 0.300 | | | | |
| | image-side surface 92 | ∞ | 0.242 | | | | |
| image plane 100 | | ∞ | | | | | |

FIG.27

| surface | 31 | 32 | 41 | 42 | 51 | 52 |
|---|---|---|---|---|---|---|
| K | 0.00000E+00 | 0.00000E+00 | 6.73115E+00 | -8.69840E+00 | 0.00000E+00 | 3.23423E+00 |
| a4 | -4.45828E-02 | -9.23007E-02 | 1.84712E-02 | 4.58717E-04 | -3.97594E-02 | -7.90445E-02 |
| a6 | -7.02557E-03 | 4.20324E-02 | 1.03361E-01 | 4.35193E-03 | -7.00568E-02 | 4.05605E-03 |
| a8 | -4.46019E-02 | -3.47259E-02 | -3.31723E-02 | -1.09305E-02 | 3.64824E-02 | 3.90215E-03 |
| a10 | 0.00000E+00 | 0.00000E+00 | 0.00000E+00 | 0.00000E+00 | 0.00000E+00 | 0.00000E+00 |
| a12 | 0.00000E+00 | 0.00000E+00 | 0.00000E+00 | 0.00000E+00 | 0.00000E+00 | 0.00000E+00 |
| a14 | 0.00000E+00 | 0.00000E+00 | 0.00000E+00 | 0.00000E+00 | 0.00000E+00 | 0.00000E+00 |
| a16 | 0.00000E+00 | 0.00000E+00 | 0.00000E+00 | 0.00000E+00 | 0.00000E+00 | 0.00000E+00 |
| a18 | 0.00000E+00 | 0.00000E+00 | 0.00000E+00 | 0.00000E+00 | 0.00000E+00 | 0.00000E+00 |
| surface | 61 | 62 | 71 | 72 | 81 | 82 |
| K | 0.00000E+00 | -5.70592E+00 | 0.00000E+00 | 0.00000E+00 | 0.00000E+00 | -5.74176E+00 |
| a4 | 7.56184E-03 | -4.08074E-02 | 8.70174E-02 | 1.23494E-01 | -7.57609E-04 | -5.13850E-02 |
| a6 | 3.43438E-03 | 2.29342E-02 | -4.72321E-02 | -2.51101E-02 | -2.23698E-03 | 1.98755E-02 |
| a8 | -5.06488E-03 | -1.04931E-02 | 1.37328E-02 | 3.41268E-04 | 2.43715E-03 | -5.21036E-03 |
| a10 | 6.45276E-04 | 2.31305E-03 | -3.66157E-03 | 2.70479E-04 | -3.06091E-04 | 6.54423E-04 |
| a12 | 0.00000E+00 | 0.00000E+00 | 4.33882E-04 | 8.67846E-06 | -2.38256E-05 | -8.88802E-06 |
| a14 | 0.00000E+00 | 0.00000E+00 | 0.00000E+00 | 0.00000E+00 | 7.01396E-06 | -5.24131E-06 |
| a16 | 0.00000E+00 | 0.00000E+00 | 0.00000E+00 | 0.00000E+00 | -4.43839E-07 | 3.18068E-07 |
| a18 | 0.00000E+00 | 0.00000E+00 | 0.00000E+00 | 0.00000E+00 | 0.00000E+00 | 0.00000E+00 |

FIG.28 system focal length =4.405mm, half field-of-view =35.699°, F-number =2.007, system length =5.904mm

| lens element | surface | radius of curvature | thickness | refractive index | Abbe number | focal length | material |
|---|---|---|---|---|---|---|---|
| object | | ∞ | ∞ | | | | |
| aperture stop 2 | | ∞ | -0.120 | | | | |
| first lens element 3 | object-side surface 31 | 2.596 | 0.537 | 1.544 | 56.114 | 3.356 | plastic |
| | image-side surface 32 | -5.774 | 0.061 | | | | |
| second lens element 4 | object-side surface 41 | -5.476 | 0.452 | 1.544 | 56.114 | 78.751 | plastic |
| | image-side surface 42 | -4.999 | 0.082 | | | | |
| third lens element 5 | object-side surface 51 | -23.846 | 0.270 | 1.640 | 23.265 | -4.701 | plastic |
| | image-side surface 52 | 3.487 | 0.546 | | | | |
| fourth lens element 6 | object-side surface 61 | -759603.000 | 1.184 | 1.544 | 56.114 | 11.907 | plastic |
| | image-side surface 62 | -6.501 | 0.485 | | | | |
| fifth lens element 7 | object-side surface 71 | 5.435 | 0.471 | 1.544 | 56.114 | 4.045 | plastic |
| | image-side surface 72 | -3.606 | 0.699 | | | | |
| sixth lens element 8 | object-side surface 81 | -8.593 | 0.200 | 1.544 | 56.114 | -2.600 | plastic |
| | image-side surface 82 | 1.714 | 0.400 | | | | |
| optical filter 9 | object-side surface 91 | ∞ | 0.300 | | | | |
| | image-side surface 92 | ∞ | 0.253 | | | | |
| image plane 100 | | ∞ | | | | | |

FIG.31

| surface | 31 | 32 | 41 | 42 | 51 | 52 |
|---|---|---|---|---|---|---|
| K | 0.00000E+00 | 0.00000E+00 | 1.07928E+01 | -2.77220E+01 | 0.00000E+00 | 3.83630E+00 |
| a4 | -1.59746E-02 | -1.01304E-02 | 3.55002E-02 | 3.05328E-02 | -4.03308E-03 | -4.40908E-02 |
| a6 | -1.14292E-02 | 2.52143E-02 | 5.38232E-02 | -1.72659E-02 | -3.55268E-02 | -2.45849E-03 |
| a8 | -1.13413E-02 | -1.80829E-02 | -1.37437E-02 | 2.60382E-03 | 1.54648E-02 | 4.68304E-03 |
| a10 | 0.00000E+00 | 0.00000E+00 | 0.00000E+00 | 0.00000E+00 | 0.00000E+00 | 0.00000E+00 |
| a12 | 0.00000E+00 | 0.00000E+00 | 0.00000E+00 | 0.00000E+00 | 0.00000E+00 | 0.00000E+00 |
| a14 | 0.00000E+00 | 0.00000E+00 | 0.00000E+00 | 0.00000E+00 | 0.00000E+00 | 0.00000E+00 |
| a16 | 0.00000E+00 | 0.00000E+00 | 0.00000E+00 | 0.00000E+00 | 0.00000E+00 | 0.00000E+00 |
| a18 | 0.00000E+00 | 0.00000E+00 | 0.00000E+00 | 0.00000E+00 | 0.00000E+00 | 0.00000E+00 |
| surface | 61 | 62 | 71 | 72 | 81 | 82 |
| K | 0.00000E+00 | -1.00176E+02 | 0.00000E+00 | 0.00000E+00 | 0.00000E+00 | -5.53767E+00 |
| a4 | -3.02785E-02 | -8.17082E-02 | 4.96009E-02 | 1.45262E-01 | -7.10335E-02 | -6.30147E-02 |
| a6 | -8.27390E-03 | 8.49500E-03 | -2.28542E-02 | -3.94241E-02 | 7.69563E-03 | 1.95495E-02 |
| a8 | 2.78826E-04 | -4.58597E-04 | 3.75033E-03 | 2.39708E-03 | 2.26927E-03 | -3.78201E-03 |
| a10 | -2.50117E-03 | -3.84008E-04 | -1.20310E-03 | 1.12286E-04 | -3.38734E-04 | 3.43955E-04 |
| a12 | 0.00000E+00 | 0.00000E+00 | 1.28365E-04 | -5.43484E-06 | -3.02528E-05 | 1.11968E-06 |
| a14 | 0.00000E+00 | 0.00000E+00 | 0.00000E+00 | 0.00000E+00 | 7.35980E-06 | -2.30447E-06 |
| a16 | 0.00000E+00 | 0.00000E+00 | 0.00000E+00 | 0.00000E+00 | -3.50593E-07 | 1.05247E-07 |
| a18 | 0.00000E+00 | 0.00000E+00 | 0.00000E+00 | 0.00000E+00 | 0.00000E+00 | 0.00000E+00 |

FIG.32

| relationship | first preferred embodiment | second preferred embodiment | third preferred embodiment | fourth preferred embodiment | fifth preferred embodiment | sixth preferred embodiment | seventh preferred embodiment | eighth preferred embodiment |
|---|---|---|---|---|---|---|---|---|
| TTL | 5.504 | 5.531 | 5.419 | 5.310 | 5.313 | 5.352 | 5.302 | 5.940 |
| ALT | 3.521 | 3.323 | 3.007 | 3.298 | 3.227 | 3.117 | 3.242 | 3.414 |
| (T1+T3+T4+T5+T6)/T2 | 9.258 | 6.130 | 7.253 | 6.590 | 6.975 | 6.317 | 7.653 | 5.889 |
| (T1+T2+T3+T4+T6)/T5 | 4.368 | 2.817 | 9.026 | 4.099 | 9.058 | 3.711 | 3.928 | 5.611 |
| (G12+G23+G45+G56)/T2 | 0.806 | 0.533 | 2.936 | 0.643 | 0.627 | 0.694 | 1.194 | 2.936 |
| ALT/T5 | 5.868 | 4.196 | 11.137 | 5.609 | 11.089 | 5.212 | 5.430 | 7.248 |
| TTL/T5 | 9.173 | 6.984 | 20.070 | 9.031 | 18.258 | 8.950 | 8.881 | 12.611 |
| ALT/G34 | 5.088 | 3.640 | 5.294 | 4.457 | 4.355 | 4.075 | 3.555 | 6.253 |
| TTL/T4 | 6.348 | 19.407 | 5.479 | 7.618 | 7.790 | 7.668 | 8.552 | 5.017 |

FIG.34

IMAGING LENS, AND ELECTRONIC APPARATUS INCLUDING THE SAME

CROSS-REFERENCE TO RELATED APPLICATION

This application claims priority to Chinese Application No. 201310385034.2, filed on Aug. 29, 2013.

BACKGROUND OF THE INVENTION

1. Field of the Invention

The present invention relates to an imaging lens and an electronic apparatus including the same.

2. Description of the Related Art

In recent years, as use of portable electronic devices (e.g., mobile phones and digital cameras) becomes ubiquitous, much effort has been put into reducing dimensions of portable electronic devices. Moreover, as dimensions of charged coupled device (CCD) and complementary metal-oxide semiconductor (CMOS) based optical sensors are reduced, dimensions of imaging lenses for use with the optical sensors must be correspondingly reduced without significantly compromising optical performance.

U.S. Pat. No. 8,355,215 discloses an imaging lens with six lens elements, which has a system length of 2 cm. Although the imaging lens has acceptable image quality, its large size is not suitable for electronic devices that tend to have a small thickness, which may range from 1 cm to 2 cm.

U.S. Pat. No. 8,432,619 discloses an imaging lens with six lens elements, which has a system length of 0.5 cm, satisfying requirements of reduced thickness. However, it has image distortion of 25%. Such poor image quality cannot fulfill specification requirements of consumer electronic products.

Reducing the system length of the imaging lens while maintaining satisfactory optical performance is always a goal in the industry.

SUMMARY OF THE INVENTION

Therefore, an object of the present invention is to provide an imaging lens that has a shorter overall length while maintaining good optical performance.

According to one aspect of the present invention, an imaging lens comprises a first lens element, a second lens element, a third lens element, a fourth lens element, a fifth lens element and a sixth lens element arranged in order from an object side to an image side along an optical axis of the imaging lens. Each of the first lens element, the second lens element, the third lens element, the fourth lens element, the fifth lens element and the sixth lens element has a refractive power, and has an object-side surface facing toward the object side and an image-side surface facing toward the image side.

The refractive power of the first lens element is positive.

The object-side surface of the second lens element has a concave portion in a vicinity of the optical axis.

The refractive power of the third lens element is negative, and the image-side surface of the third lens element has a concave portion in a vicinity of the optical axis.

The object-side surface of the fourth lens element has a concave portion in a vicinity of the optical axis, and the image-side surface of the fourth lens element has a convex portion in a vicinity of the optical axis.

The image-side surface of the sixth lens element has a concave portion in a vicinity of the optical axis, and a convex portion in a vicinity of a periphery of the sixth lens element.

The imaging lens does not include any lens element with refractive power other than the first lens element, the second lens element, the third lens element, the fourth lens element, the fifth lens element and the sixth lens element.

Another object of the present invention is to provide an electronic apparatus having an imaging lens with six lens elements.

According to another aspect of the present invention, an electronic apparatus includes a housing and an imaging module. The imaging module is disposed in the housing, and includes the imaging lens of the present invention, a barrel on which the imaging lens is disposed, a holder unit on which the barrel is disposed, and an image sensor disposed at the image side of the imaging lens.

BRIEF DESCRIPTION OF THE DRAWINGS

Other features and advantages of the present invention will become apparent in the following detailed description of the preferred embodiments with reference to the accompanying drawings, of which:

FIG. 3 shows values of some optical parameters corresponding to the imaging lens of the first preferred embodiment;

FIG. 4 shows values of some parameters of an optical relationship corresponding to the imaging lens of the first preferred embodiment;

FIG. 7 shows values of some optical parameters corresponding to the imaging lens of the second preferred embodiment;

FIG. 8 shows values of some parameters of an optical relationship corresponding to the imaging lens of the second preferred embodiment;

FIGS. 9(a) to 9(d) show different optical characteristics of the imaging lens of the second preferred embodiment;

FIG. 11 shows values of some optical parameters corresponding to the imaging lens of the third preferred embodiment;

FIG. 12 shows values of some parameters of an optical relationship corresponding to the imaging lens of the third preferred embodiment;

FIG. 15 shows values of some optical parameters corresponding to the imaging lens of the fourth preferred embodiment;

FIG. 16 shows values of some parameters of an optical relationship corresponding to the imaging lens of the fourth preferred embodiment;

FIG. 19 shows values of some optical parameters corresponding to the imaging lens of the fifth preferred embodiment;

FIG. 20 shows values of some parameters of an optical relationship corresponding to the imaging lens of the fifth preferred embodiment;

FIG. 23 shows values of some optical parameters corresponding to the imaging lens of the sixth preferred embodiment;

FIG. 24 shows values of some parameters of an optical relationship corresponding to the imaging lens of the sixth preferred embodiment;

FIG. 27 shows values of some optical parameters corresponding to the imaging lens of the seventh preferred embodiment;

FIG. 28 shows values of some parameters of an optical relationship corresponding to the imaging lens of the seventh preferred embodiment;

FIG. 31 shows values of some optical parameters corresponding to the imaging lens of the eighth preferred embodiment;

FIG. 32 shows values of some parameters of an optical relationship corresponding to the imaging lens of the eighth preferred embodiment;

FIG. 34 is a table that lists values of parameters of other optical relationships corresponding to the imaging lenses of the first to eighth preferred embodiments;

DETAILED DESCRIPTION OF THE PREFERRED EMBODIMENTS

Figure 1:
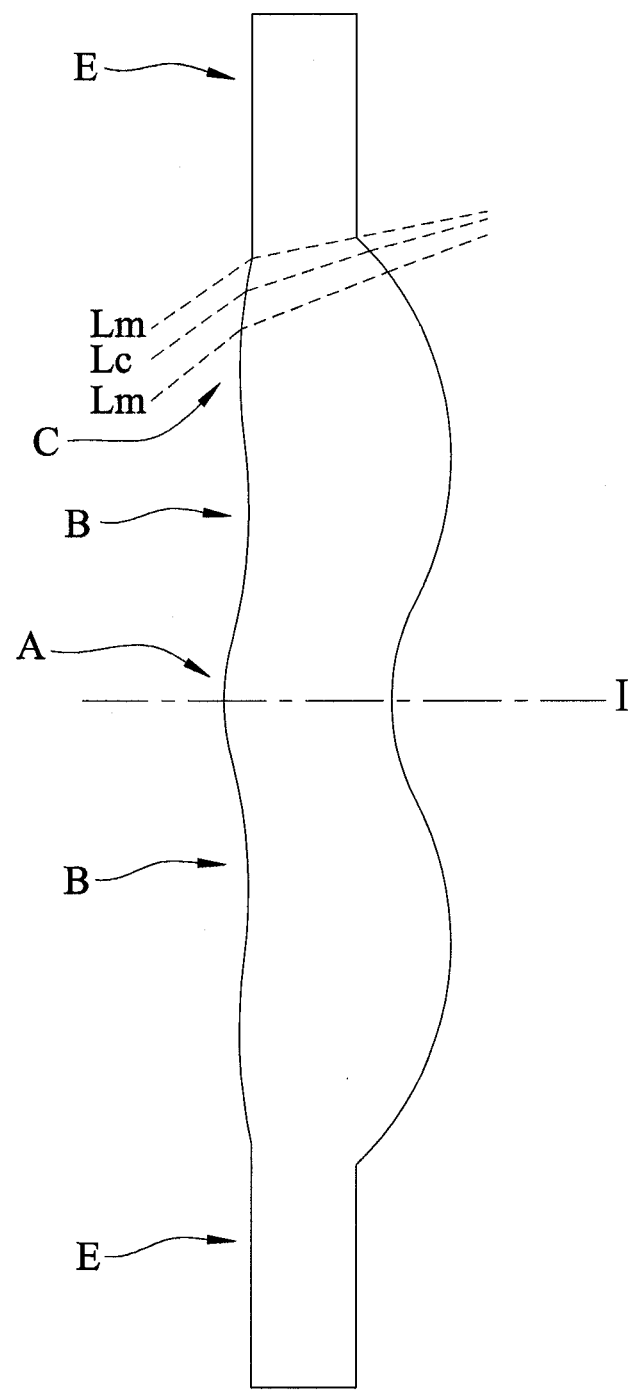
FIG. 1 is a schematic diagram to illustrate the structure of a lens element.

Before the present invention is described in greater detail, it should be noted that like elements are denoted by the same reference numerals throughout the disclosure.

In the following description, "a lens element has a positive (or negative) refractive power" means the lens element has a positive (or negative) refractive power in a vicinity of an optical axis thereof. "An object-side surface (or image-side surface) has a convex (or concave) portion at a certain area" means that, compared to a radially exterior area adjacent to said certain area, said certain area is more convex (or concave) in a direction parallel to the optical axis. Referring to FIG. 1 as an example, the lens element is radially symmetrical with respect to an optical axis (I) thereof. The object-side surface of the lens element has a convex portion at an area A, a concave portion at an area B, and a convex portion at an area C. This is because the area A is more convex in a direction parallel to the optical axis (I) in comparison with a radially exterior area thereof (i.e., area B), the area B is more concave in comparison with the area C, and the area C is more convex in comparison with an area E. "In a vicinity of a periphery" refers to an area around a periphery of a curved surface of the lens element for passage of imaging light only, which is the area C in FIG. 1. The imaging light includes a chief ray Lc and a marginal ray Lm. "In a vicinity of the optical axis" refers to an area around the optical axis of the curved surface for passage of the imaging light only, which is the area A in FIG. 1. In addition, the lens element further includes an extending portion E for installation into an optical imaging lens device. Ideally, the imaging light does not pass through the extending portion E. The structure and shape of the extending portion E are not limited herein. In the following embodiments, the extending portion E is not depicted in the drawings for the sake of clarity.

Figure 2:
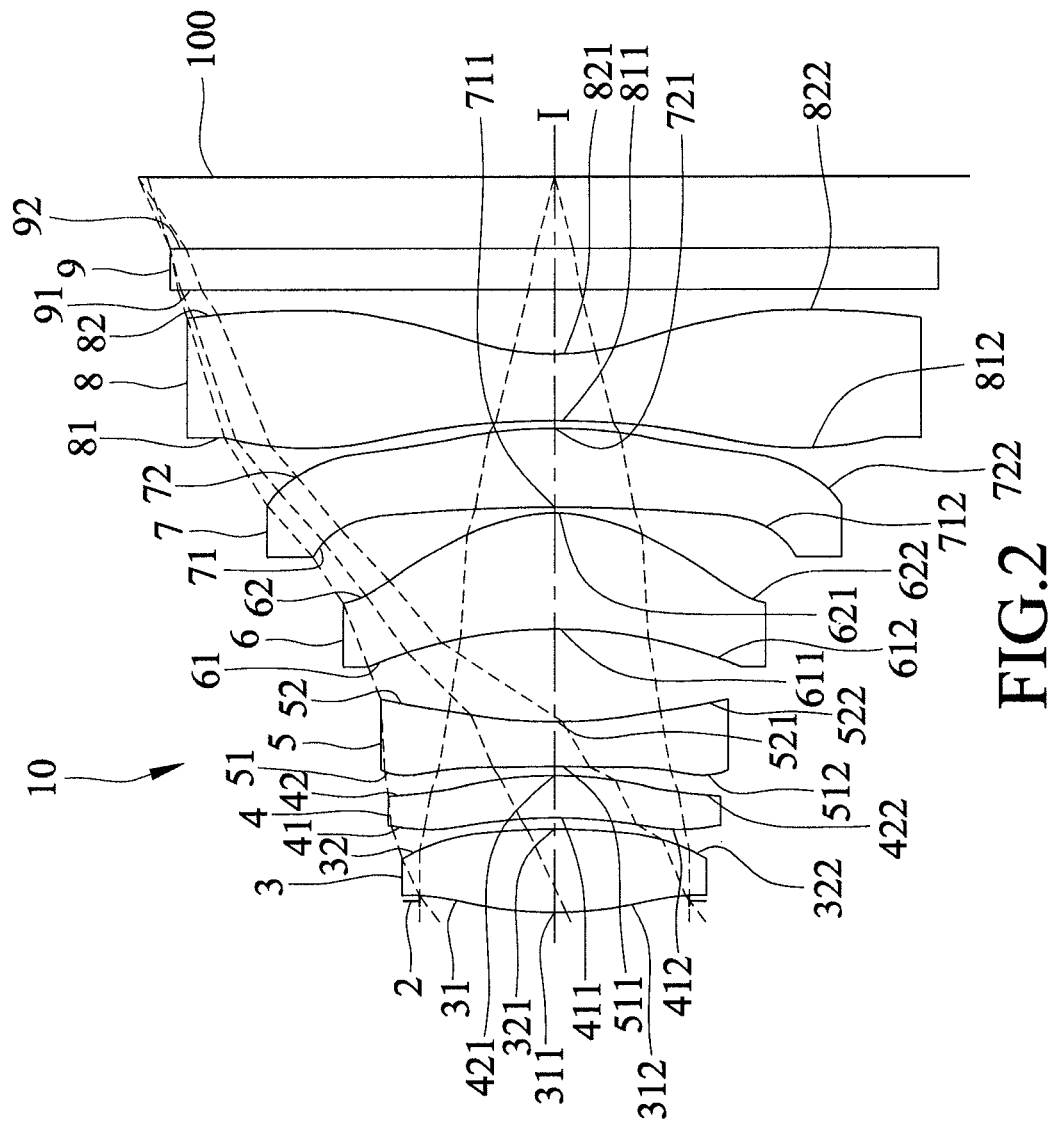
FIG. 2 is a schematic diagram that illustrates the first preferred embodiment of an imaging lens according to the present invention.

Referring to FIG. 2, the first preferred embodiment of an imaging lens 10 according to the present invention includes an aperture stop 2, first, second, third, fourth, fifth and sixth lens elements 3-8, and an optical filter 9 arranged in the given order along an optical axis (I) from an object side to an image side. The optical filter 9 is an infrared cut filter for selectively absorbing infrared light to thereby reduce imperfection of images formed at an image plane 100. It should be noted that the present invention uses an image sensor (not shown) packaged using COB (chip on board) techniques. Compared to the conventional CSP (chip scale package), a cover glass is not required for the COB technique. Hence, the imaging lens of the present invention does not include the cover glass.

Each of the first, second, third, fourth, fifth and sixth lens elements 3-8 and the optical filter 9 has an object-side surface 31, 41, 51, 61, 71, 81, 91 facing toward the object side, and an image-side surface 32, 42, 52, 62, 72, 82, 92 facing toward the image side. Light entering the imaging lens 10 travels through the aperture stop 2, the object-side and image-side surfaces 31, 32 of the first lens element 3, the object-side and image-side surfaces 41, 42 of the second lens element 4, the object-side and image-side surfaces 51, 52 of the third lens element 5, the object-side and image-side surfaces 61, 62 of the fourth lens element 6, the object-side and image-side surfaces 71, 72 of the fifth lens element 7, the object-side and image-side surfaces 81, 82 of the sixth lens element 8, and the object-side and image-side surfaces 91, 92 of the optical filter 9, in the given order, to form an image on the image plane 100. Each of the object-side surfaces 31, 41, 51, 61, 71, 81 and the image-side surfaces 32, 42, 52, 62, 72, 82 is aspherical and has a center point coinciding with the optical axis (I).

The lens elements 3-8 are made of a plastic material in this embodiment, and at least one of the lens elements 3-8 may be made of other materials in other embodiments.

In the first preferred embodiment, which is depicted in FIG. 2, the first lens element 3 has a positive refractive power. The object-side surface 31 of the first lens element 3 has a convex portion 311 in a vicinity of the optical axis (I), and a convex portion 312 in a vicinity of a periphery of the first lens element 3. The image-side surface 32 of the first lens element 3 has a convex portion 321 in a vicinity of the optical axis (I), and a convex portion 322 in a vicinity of a periphery of the first lens element 3.

The second lens element 4 has a positive refractive power. The object-side surface 41 of the second lens element 4 has a concave portion 411 in a vicinity of the optical axis (I), and a convex portion 412 in a vicinity of a periphery of the second lens element 4. The image-side surface 42 of the second lens element 4 is a convex surface that has a convex portion 421 in a vicinity of the optical axis (I), and a convex portion 422 in a vicinity of a periphery of the second lens element 4.

The third lens element 5 has a negative refractive power. The object-side surface 51 of the third lens element 5 has a concave portion 511 in a vicinity of the optical axis (I), and a convex portion 512 in a vicinity of a periphery of the third lens element 5. The image-side surface 52 of the third lens element 5 is a concave surface that has a concave portion 521 in a vicinity of the optical axis (I), and a concave portion 522 in a vicinity of the periphery of the third lens element 5.

The fourth lens element 6 has a positive refractive power. The object-side surface 61 of the fourth lens element 6 is a concave surface that has a concave portion 611 in a vicinity of the optical axis (I), and a concave portion 612 in a vicinity of a periphery of the fourth lens element 6. The image-side surface 62 of the fourth lens element 6 is a convex surface that has a convex portion 621 in a vicinity of the optical axis (I), and a convex portion 622 in a vicinity of the periphery of the fourth lens element 6.

The fifth lens element 7 has a positive refractive power. The object-side surface 71 of the fifth lens element 7 is a concave surface that has a concave portion 711 in a vicinity of the optical axis (I), and a concave portion 712 in a vicinity of a periphery of the fifth lens element 7. The image-side surface 72 of the fifth lens element 7 is a convex surface that has a convex portion 721 in a vicinity of the optical axis (I), and a convex portion 722 in a vicinity of the periphery of the fifth lens element 7.

The sixth lens element 8 has a negative refractive power. The object-side surface 81 of the sixth lens element 8 has a concave portion 811 in a vicinity of the optical axis (I), and a convex portion 812 in a vicinity of a periphery of the sixth lens element 8. The image-side surface 82 of the sixth lens element 8 has a concave portion 821 in a vicinity of the optical axis (I), and a convex portion 822 in a vicinity of the periphery of the sixth lens element 8.

In the first preferred embodiment, the imaging lens 10 does not include any lens element with refractive power other than the abovementioned first to sixth lens elements 3-8.

Shown in FIG. 3 is a table that lists values of some optical parameters corresponding to the surfaces 31-91, 32-92 of the first preferred embodiment. The imaging lens 10 has an overall system effective focal length (EFL) of 3.977 mm, a half field-of-view (HFOV) of 37.807°, an F-number of 2.022, and a system length of 5.502 mm. The system length refers to a distance between the object-side surface 31 of the first lens element 3 and the image plane 100.

In this embodiment, each of the object-side surfaces 31-81 and the image-side surfaces 32-82 is aspherical, and satisfies the optical relationship of $$Z(Y) = \frac{Y^2}{R} \bigg/ \left(1 + \sqrt{1-(1+K)\frac{Y^2}{R^2}}\right) + \sum_{i=1}^{n} a_i \times Y^i \tag{1}$$

where:

R represents a radius of curvature of the aspherical surface;

Z represents a depth of an aspherical surface, which is defined as a perpendicular distance between an arbitrary point on the aspherical surface that is spaced apart from the optical axis (I) by a distance Y, and a tangent plane at a vertex of the aspherical surface at the optical axis (I);

Y represents a perpendicular distance between the arbitrary point on the aspherical surface and the optical axis (I);

K represents a conic constant; and $a_i$ represents a $i^{th}$ aspherical coefficient.

Shown in FIG. 4 is a table that lists values of some optical parameters of the aforementioned optical relationship (1) corresponding to the first preferred embodiment.

Relationships among some of the aforementioned optical parameters corresponding to the first preferred embodiment are as follows:

TTL=5.504

ALT=3.521

$(T1+T3+T4+T5+T6)/T2$=9.258

$(T1+T2+T3+T4+T6)/T5$=4.368

$(G12+G23+G45+G56)/T2$=0.806

ALT/$T5$=5.868

TTL/$T5$=9.173

ALT/$G34$=5.088

TTL/$T4$=6.348 where:

TTL represents a distance between the object-side surface 31 of the first lens element 3 and the image plane 100 at the optical axis (I);

ALT represents a sum of a distance between the object-side surface 31 and the image-side surface 32 of the first lens element 3 at the optical axis (I), a distance between the object-side surface 41 and the image-side surface 42 of the second lens element 4 at the optical axis (I), a distance between the object-side surface 51 and the image-side surface 52 of the third lens element 5 at the optical axis (I), a distance between the object-side surface 61 and the image-side surface 62 of the fourth lens element 6 at the optical axis (I), a distance between the object-side surface 71 and the image-side surface 72 of the fifth lens element 7 at the optical axis (I), and a distance between the object-side surface 81 and the image-side surface 82 of the sixth lens element 8 at the optical axis (I);

T1 represents the distance between the object-side surface 31 and the image-side surface 32 of the first lens element 3 at the optical axis (I);

T2 represents the distance between the object-side surface 41 and the image-side surface 42 of the second lens element 4 at the optical axis (I);

T3 represents the distance between the object-side surface 51 and the image-side surface 52 of the third lens element 5 at the optical axis (I);

T4 represents the distance between the object-side surface 61 and the image-side surface 62 of the fourth lens element 6 at the optical axis (I);

T5 represents the distance between the object-side surface 71 and the image-side surface 72 of the fifth lens element 7 at the optical axis (I);

T6 represents the distance between the object-side surface 81 and the image-side surface 82 of the sixth lens element 8 at the optical axis (I);

G12 represents a distance between the image-side surface 32 of the first lens element 3 and the object-side surface 41 of the second lens element 4 at the optical axis (I);

G23 represents a distance between the image-side surface 42 of the second lens element 4 and the object-side surface 51 of the third lens element 5 at the optical axis (I);

G34 represents a distance between the image-side surface 52 of the third lens element 5 and the object-side surface 61 of the fourth lens element 6 at the optical axis (I);

G45 represents a distance between the image-side surface 62 of the fourth lens element 6 and the object-side surface 71 of the fifth lens element 7 at the optical axis (I); and G56 represents a distance between the image-side surface 72 of the fifth lens element 7 and the object-side surface 81 of the sixth lens element 8 at the optical axis (I).

Figure 5:
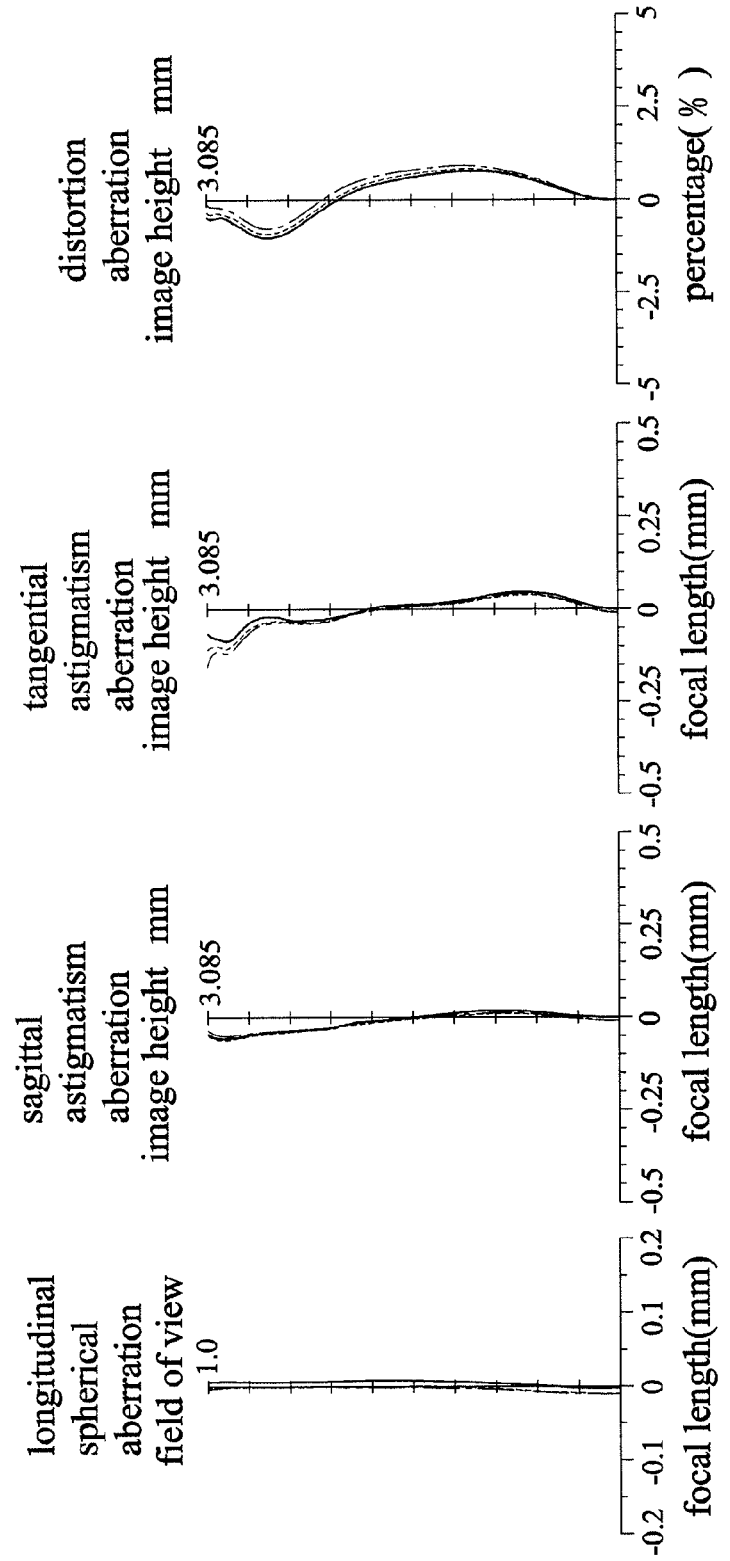
FIGS. 5(a) to 5(d) show different optical characteristics of the imaging lens of the first preferred embodiment.

FIG. 5(a) shows simulation results corresponding to longitudinal spherical aberration of the first preferred embodiment. FIGS. 5(b) to 5(d) respectively show simulation results corresponding to sagittal astigmatism aberration, tangential astigmatism aberration, and distortion aberration of the first preferred embodiment at the image plane 100. In each of the simulation results, curves corresponding respectively to wavelengths of 470 nm, 588 nm, and 650 nm are shown.

It can be understood from FIG. 5(a) that, since each of the curves corresponding to longitudinal spherical aberration has a focal length at each field of view (indicated by the vertical axis) that falls within the range of ±0.05 mm, the first preferred embodiment is able to achieve a relatively low spherical aberration at each of the wavelengths. Furthermore, since the curves corresponding to longitudinal spherical aberration are close to each other, the first preferred embodiment has a relatively low chromatic aberration.

It can be understood from FIGS. 5(b) and 5(c) that, since each of the curves falls within the range of ±0.2 mm of focal length, the first preferred embodiment has a relatively low optical aberration.

Moreover, as shown in FIG. 5(d), since each of the curves corresponding to distortion aberration falls within the range of ±1%, the first preferred embodiment is able to meet requirements in imaging quality of most optical systems.

In view of the above, even with the system length reduced down to 5.502 mm, the imaging lens 10 of the first preferred embodiment is still able to achieve a relatively good optical performance.

Figure 6:
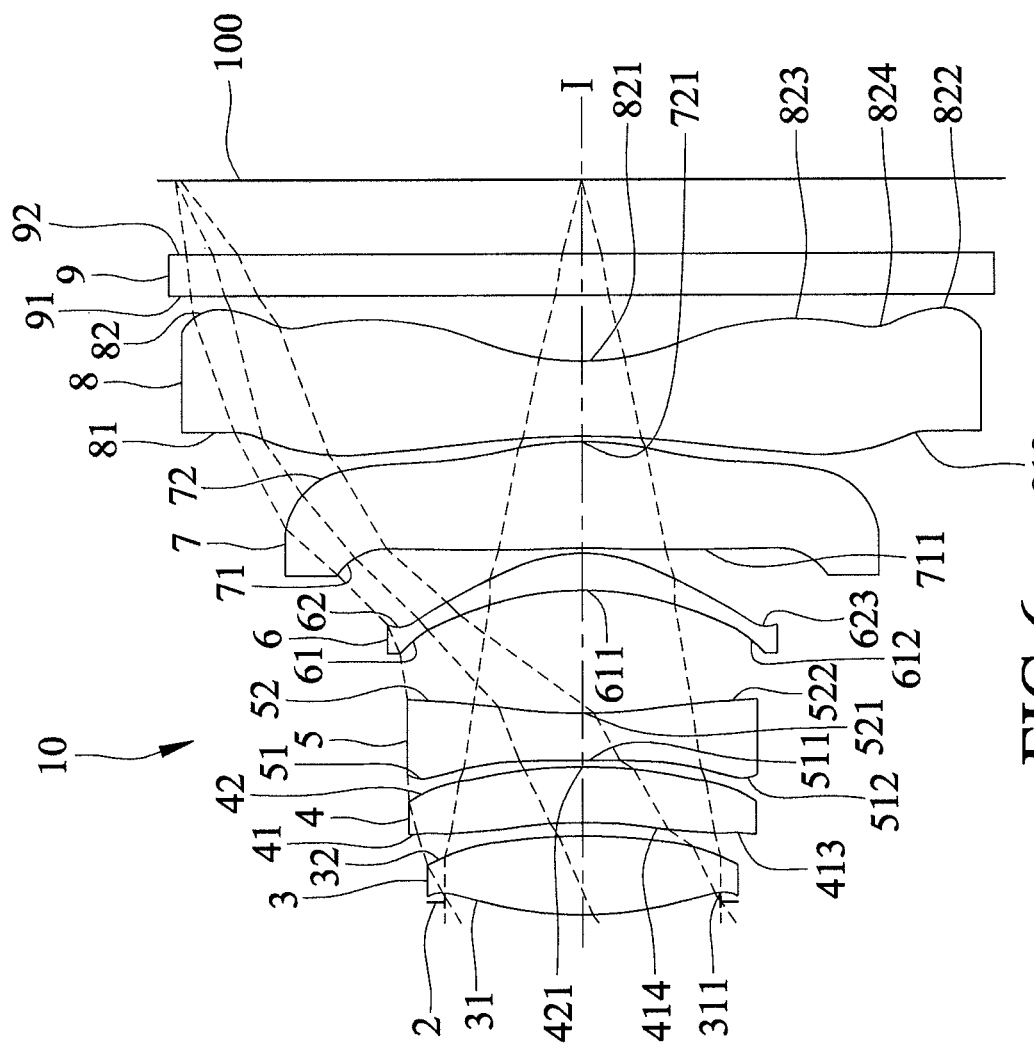
FIG. 6 is a schematic diagram that illustrates the second preferred embodiment of an imaging lens according to the present invention.

Referring to FIG. 6, the differences between the first and second preferred embodiments of the imaging lens 10 of this invention reside in that: the object-side surface 31 of the first lens element 3 has a concave portion 311 in a vicinity of a periphery of the first lens element 3; the object-side surface 41 of the second lens element 4 has a concave portion 413 in a vicinity of a periphery of the second lens element 4, and a convex portion 414 between a concave optical axis portion thereof and the concave portion 413; the image-side surface 62 of the fourth lens element 6 has a concave portion 623 in a vicinity of a periphery of the fourth lens element 6; the object-side surface 71 of the fifth lens element 7 has a convex portion 711 between an optical axis portion thereof and a periphery portion thereof; and the object-side surface 81 of the sixth lens element 8 has a concave portion 813 in a vicinity of a periphery of the sixth lens element 8, and the image-side surface 82 of the sixth lens element 8 has a convex portion 823 and a concave portion 824 between the concave portion 821 and the convex portion 822.

Shown in FIG. 7 is a table that lists values of some optical parameters corresponding to the surfaces 31-91, 32-92 of the second preferred embodiment. The imaging lens 10 has an overall system focal length of 4.173 mm, an HFOV of 36.616°, an F-number of 2.044, and a system length of 5.531 mm.

Shown in FIG. 8 is a table that lists values of some optical parameters of the aforementioned optical relationship (1) corresponding to the second preferred embodiment.

Relationships among some of the aforementioned optical parameters corresponding to the second preferred embodiment are as follows:

$TTL=5.531$ $ALT=3.323$ $(T1+T3+T4+T5+T6)/T2=6.130$ $(T1+T2+T3+T4+T6)/T5=2.817$ $(G12+G23+G45+G56)/T2=0.533$ $ALT/T5=4.196$ $TTL/T5=6.984$ $ALT/G34=3.640$ $TTL/T4=19.407$

FIGS. 9(a) to 9(d) respectively show simulation results corresponding to longitudinal spherical aberration, sagittal astigmatism aberration, tangential astigmatism aberration, and distortion aberration of the second preferred embodiment. It can be understood from FIGS. 9(a), 9(b), 9(c) and 9(d) that the second preferred embodiment is able to achieve a relatively good optical performance.

Figure 10:
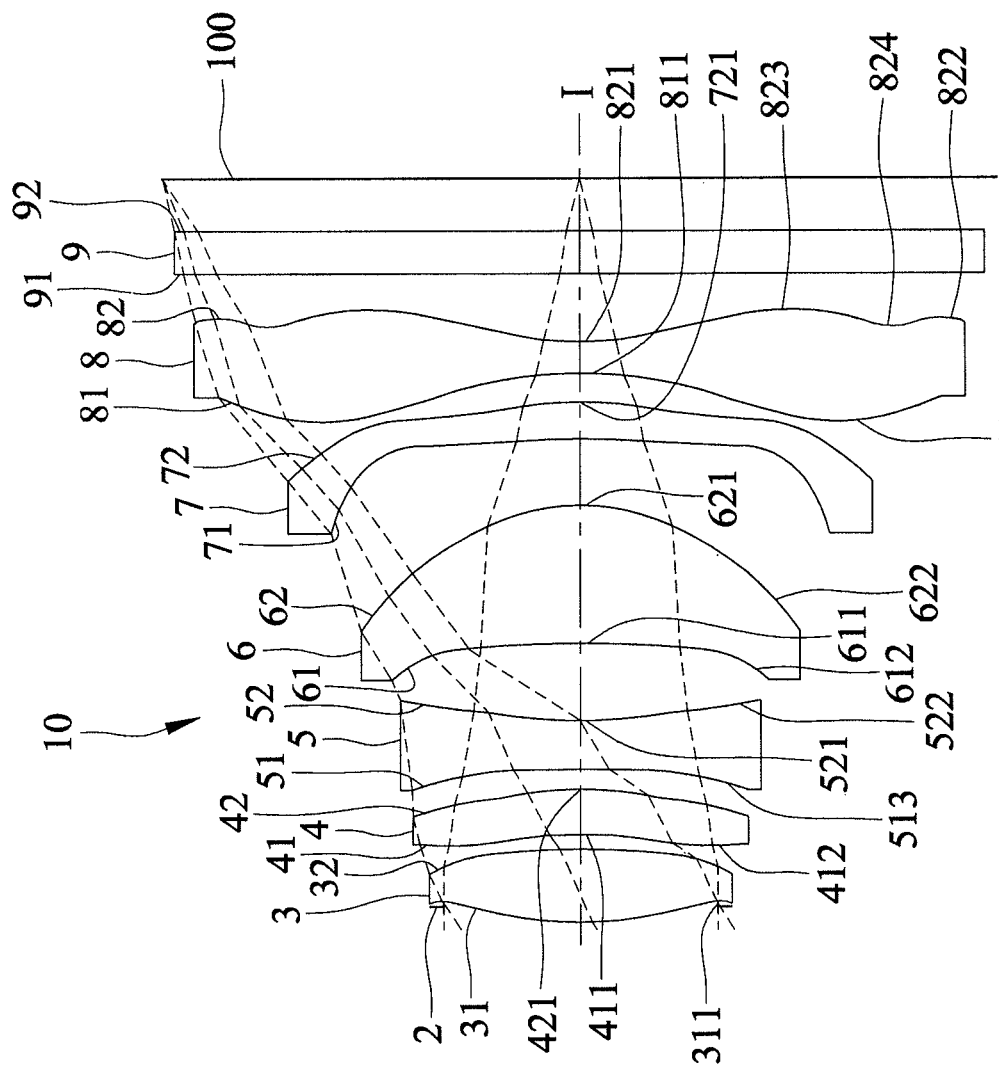
FIG. 10 is a schematic diagram that illustrates the third preferred embodiment of an imaging lens according to the present invention.
Figures 13A, 13B, 13C, 13D:
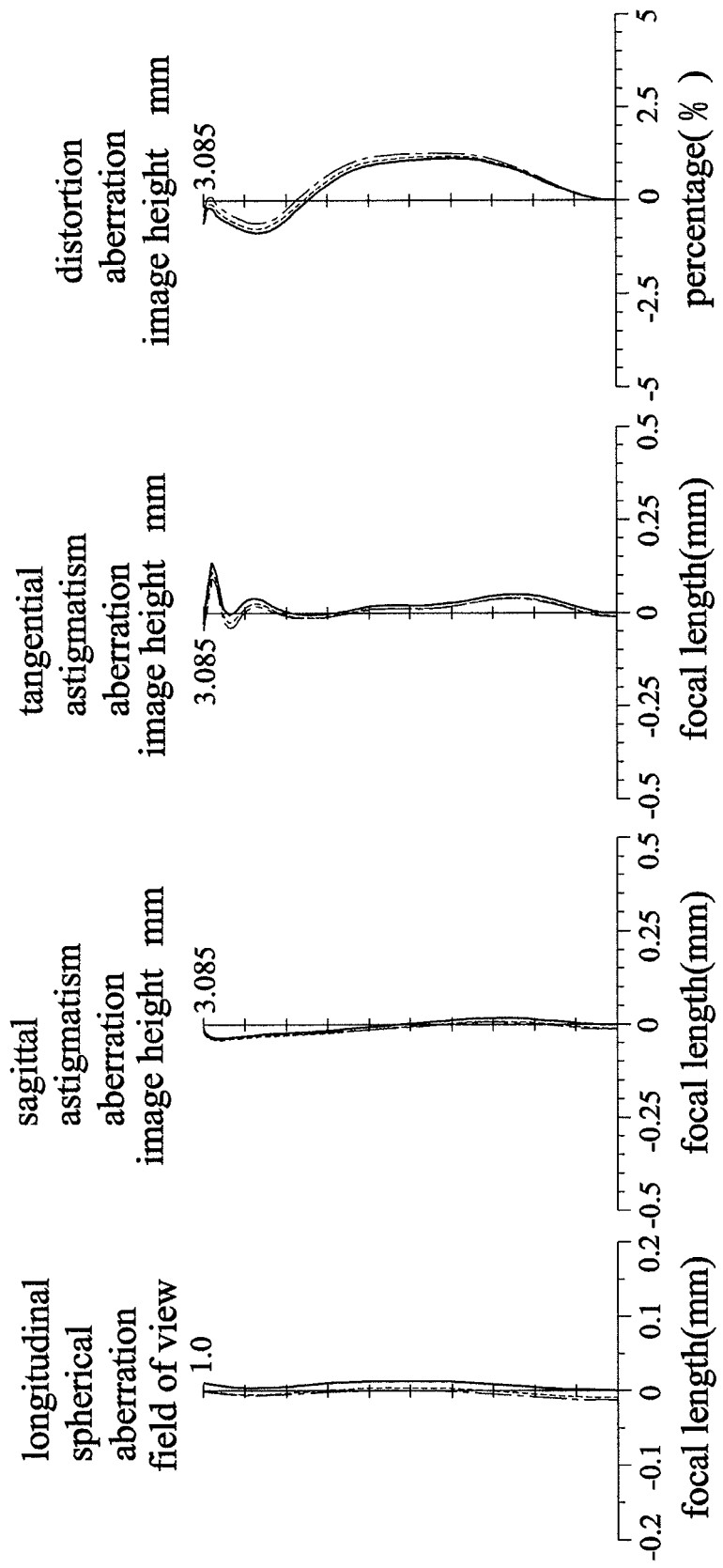
FIGS. 13(a) to 13(d) show different optical characteristics of the imaging lens of the third preferred embodiment.

Referring to FIG. 10, the differences between the first and third preferred embodiments of the imaging lens 10 of this invention reside in that: the object-side surface 31 of the first lens element 3 has a concave portion 311 in a vicinity of a periphery of the first lens element 3; the object-side surface 51 of the third lens element 5 has a concave portion 513 in a vicinity of a periphery of the third lens element 5; and the object-side surface 81 of the sixth lens element 8 has a concave portion 813 in a vicinity of a periphery of the sixth lens element 6, and the image-side surface 82 of the sixth lens element 8 has a convex portion 823 and a concave portion 824 between the concave portion 821 and the convex portion 822.

Shown in FIG. 11 is a table that lists values of some optical parameters corresponding to the surfaces 31-91, 32-92 of the third preferred embodiment. The imaging lens 10 has an overall system focal length of 4.0248 mm, an HFOV of 37.533°, an F-number of 2.02, and a system length of 5.420 mm.

Shown in FIG. 12 is a table that lists values of some optical parameters of the aforementioned optical relationship (1) corresponding to the third preferred embodiment.

Relationships among some of the aforementioned optical parameters corresponding to the third preferred embodiment are as follows:

TTL=5.419

ALT=3.007

$(T1+T3+T4+T5+T6)/T2=7.253$ $(T1+T2+T3+T4+T6)/T5=9.026$ $(G12+G23+G45+G56)/T2=2.936$

ALT/$T5$=11.137

TTL/$T5$=20.070

ALT/$G34$=5.294

TTL/$T4$=5.479

FIGS. 13(a) to 13(d) respectively show simulation results corresponding to longitudinal spherical aberration, sagittal astigmatism aberration, tangential astigmatism aberration, and distortion aberration of the third preferred embodiment. It can be understood from FIGS. 13(a), 13(b), 13(c) and 13(d) that the third preferred embodiment is able to achieve a relatively good optical performance.

Figure 14:
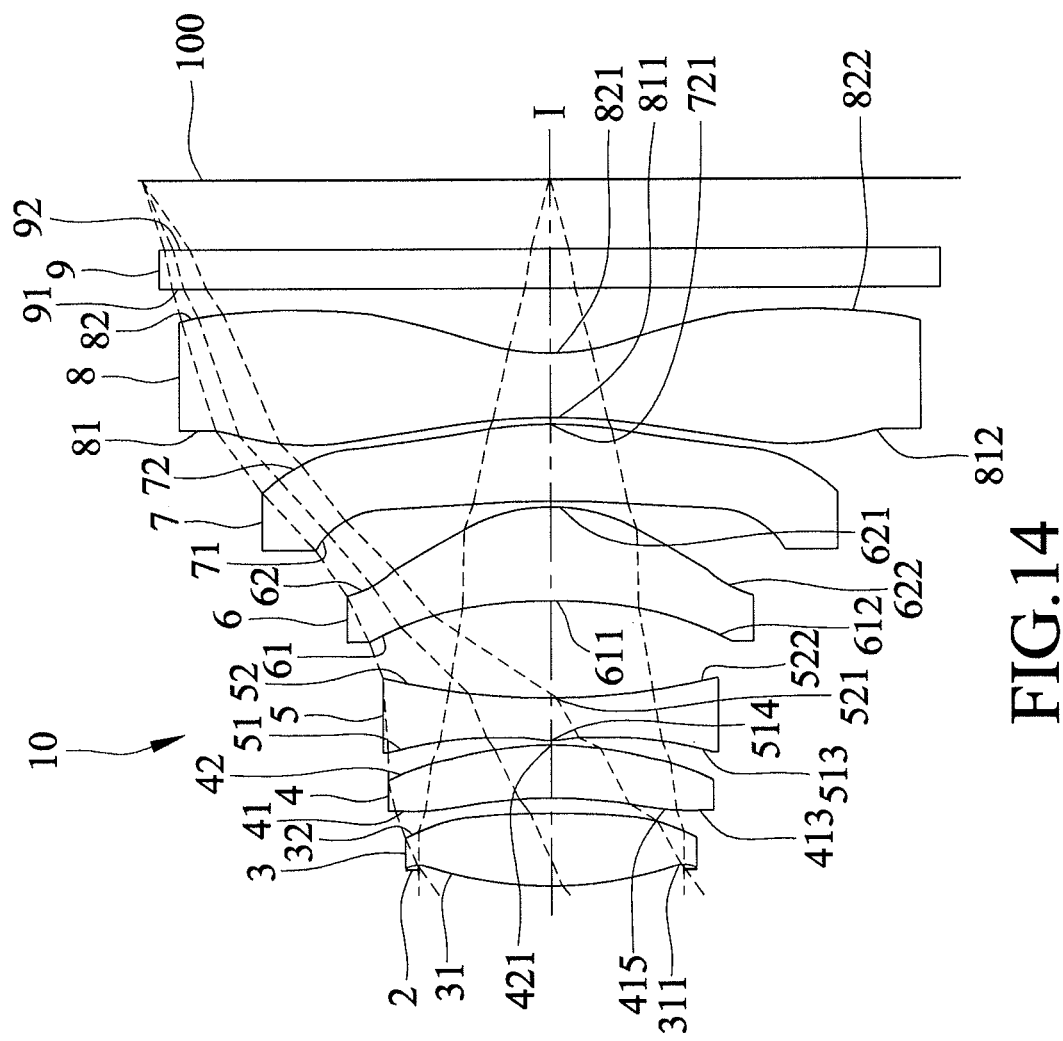
FIG. 14 is a schematic diagram that illustrates the fourth preferred embodiment of an imaging lens according to the present invention.
Figure 17:
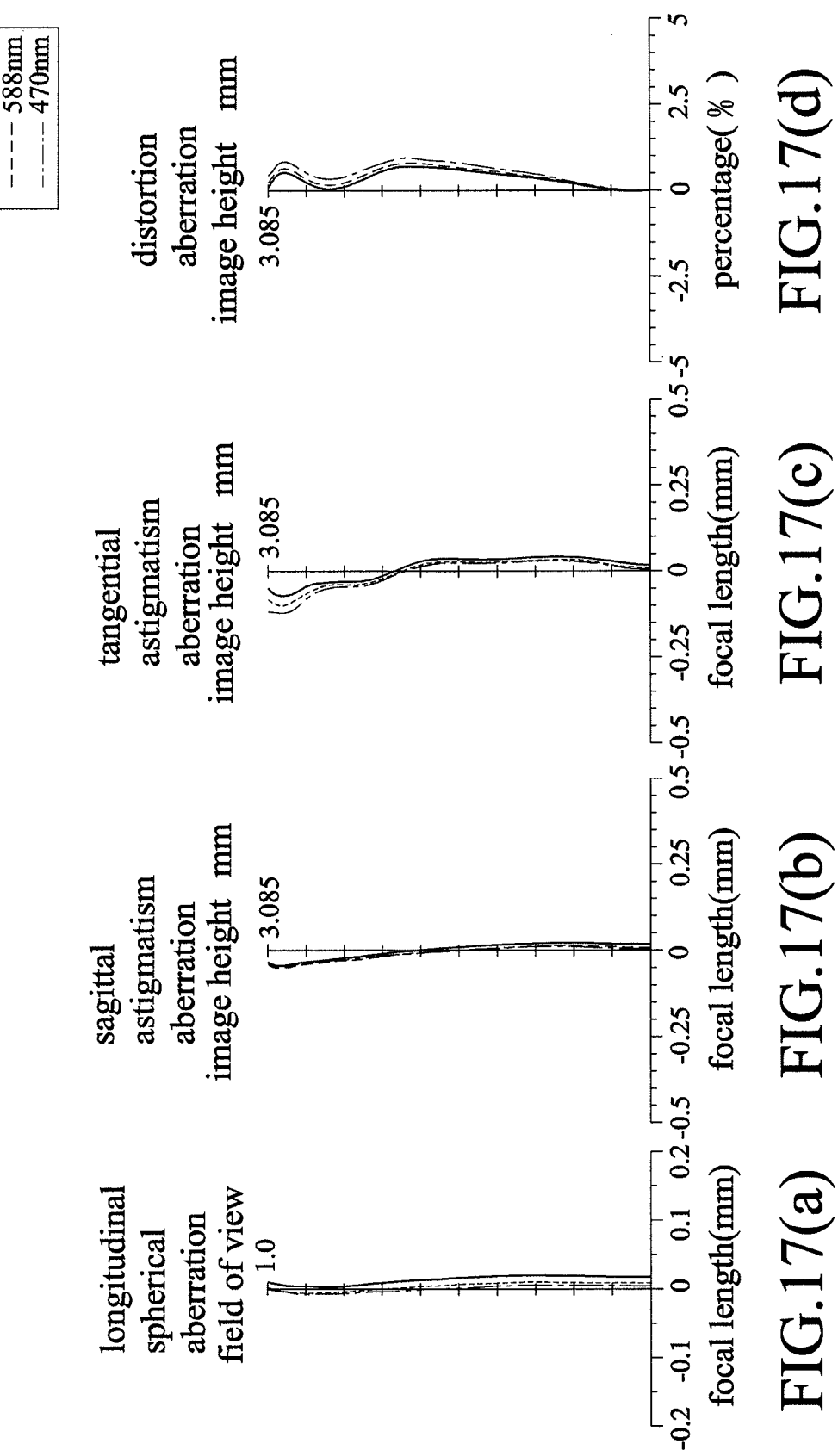
FIGS. 17(a) to 17(d) show different optical characteristics of the imaging lens of the fourth preferred embodiment.

Referring to FIG. 14, the differences between the first and fourth preferred embodiments of the imaging lens 10 of this invention reside in that: the object-side surface 31 of the first lens element 3 has a concave portion 311 in a vicinity of a periphery of the first lens element 3; the object-side surface 41 of the second lens element 4 has a concave portion 413 in a vicinity of a periphery of the second lens element 4, and a convex portion 415 between a concave optical axis portion thereof and the convex portion 413; and the object-side surface 51 of the third lens element 5 has a convex portion 514 in a vicinity of the optical axis (I), and a concave portion 513 in a vicinity of a periphery of the third lens element 5.

Shown in FIG. 15 is a table that lists values of some optical parameters corresponding to the surfaces 31-91, 32-92 of the fourth preferred embodiment. The imaging lens 10 has an overall system focal length of 3.931 mm, an HFOV of 38.127°, an F-number of 2.004, and a system length of 5.309 mm.

Shown in FIG. 16 is a table that lists values of some optical parameters of the aforementioned optical relationship (1) corresponding to the fourth preferred embodiment.

Relationships among some of the aforementioned optical parameters corresponding to the fourth preferred embodiment are as follows:

TTL=5.310

ALT=3.298

$(T1+T3+T4+T5+T6)/T2=6.590$ $(T1+T2+T3+T4+T6)/T5=4.099$ $(G12+G23+G45+G56)/T2=0.643$

ALT/$T5$=5.609

TTL/$T5$=9.031

ALT/$G34$=4.457

TTL/$T4$=7.618

FIGS. 17(a) to 17(d) respectively show simulation results corresponding to longitudinal spherical aberration, sagittal astigmatism aberration, tangential astigmatism aberration, and distortion aberration of the fourth preferred embodiment. It can be understood from FIGS. 17(a), 17(b), 17(c) and 17(d) that the fourth preferred embodiment is able to achieve a relatively good optical performance.

Figure 18:
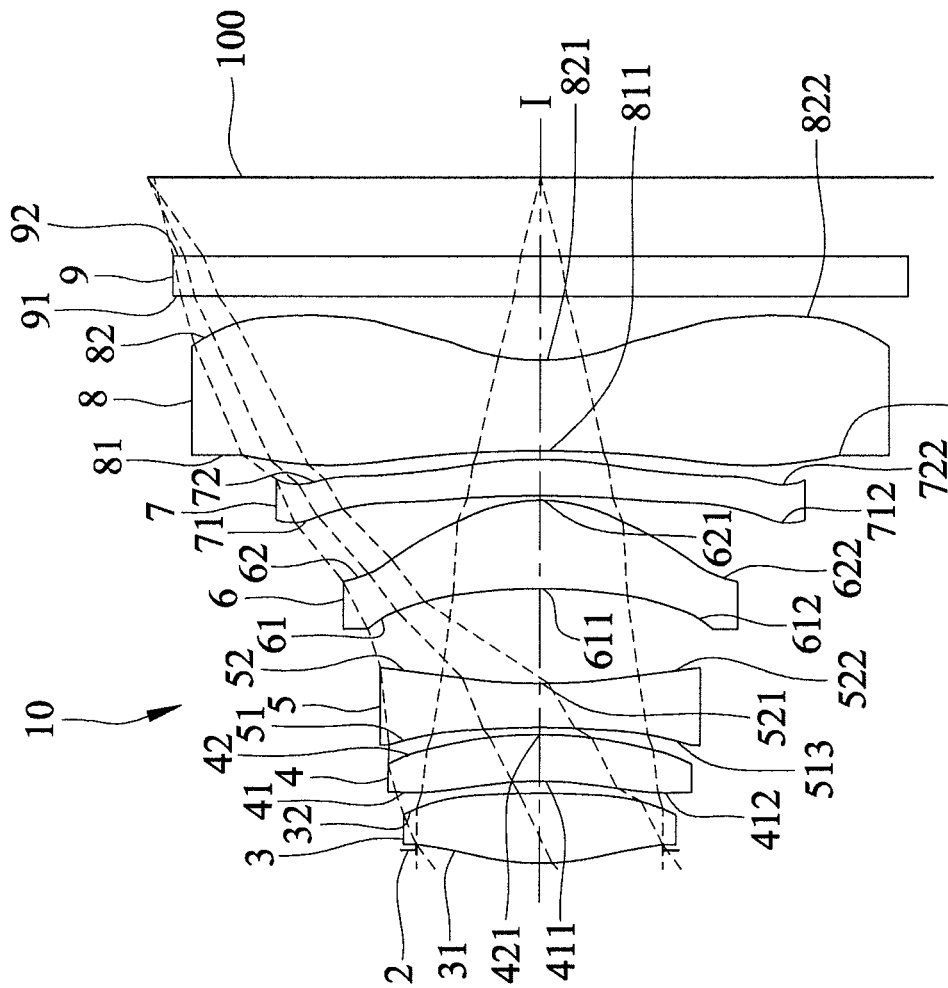
FIG. 18 is a schematic diagram that illustrates the fifth preferred embodiment of an imaging lens according to the present invention.
Figure 21:
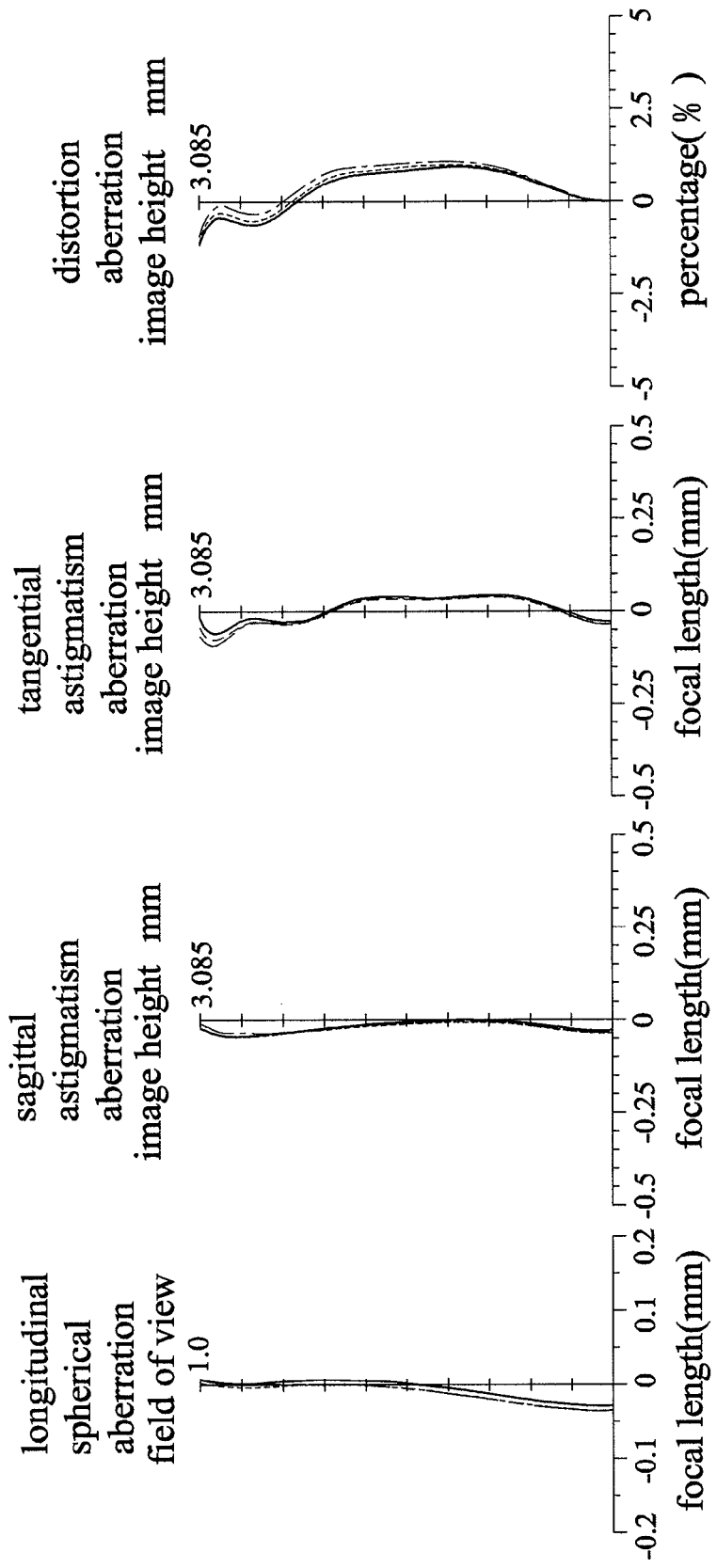
FIGS. 21(a) to 21(d) show different optical characteristics of the imaging lens of the fifth preferred embodiment.

Referring to FIG. 18, the differences between the first and fifth preferred embodiments of the imaging lens 10 of this invention reside in that: the object-side surface 51 of the third lens element 5 has a concave portion 513 in a vicinity of a periphery of the third lens element 5; and the object-side surface 71 of the fifth lens element 7 has a convex portion 712 in a vicinity of a periphery of the fifth lens element 7, and the image-side surface 72 of the fifth lens element 7 has a concave portion 722 in a vicinity of a periphery of the fifth lens element 7.

Shown in FIG. 19 is a table that lists values of some optical parameters corresponding to the surfaces 31-91, 32-92 of the fifth preferred embodiment. The imaging lens 10 has an overall system focal length of 3.851 mm, an HFOV of 38.705°, an F-number of 2.054, and a system length of 5.312 mm.

Shown in FIG. 20 is a table that lists values of some optical parameters of the aforementioned optical relationship (1) corresponding to the fifth preferred embodiment.

Relationships among some of the aforementioned optical parameters corresponding to the fifth preferred embodiment are as follows:

TTL=5.313

ALT=3.227

$(T1+T3+T4+T5+T6)/T2=6.975$ $(T1+T2+T3+T4+T6)/T5=9.058$ $(G12+G23+G45+G56)/T2=0.627$

ALT/$T5$=11.089

TTL/$T5$=18.258

ALT/$G34$=4.355

TTL/$T4$=7.790

FIGS. 21(a) to 21(d) respectively show simulation results corresponding to longitudinal spherical aberration, sagittal astigmatism aberration, tangential astigmatism aberration, and distortion aberration of the fifth preferred embodiment. It can be understood from FIGS. 21(a), 21(b), 21(c) and 21(d) that the fifth preferred embodiment is able to achieve a relatively good optical performance.

Figure 22:
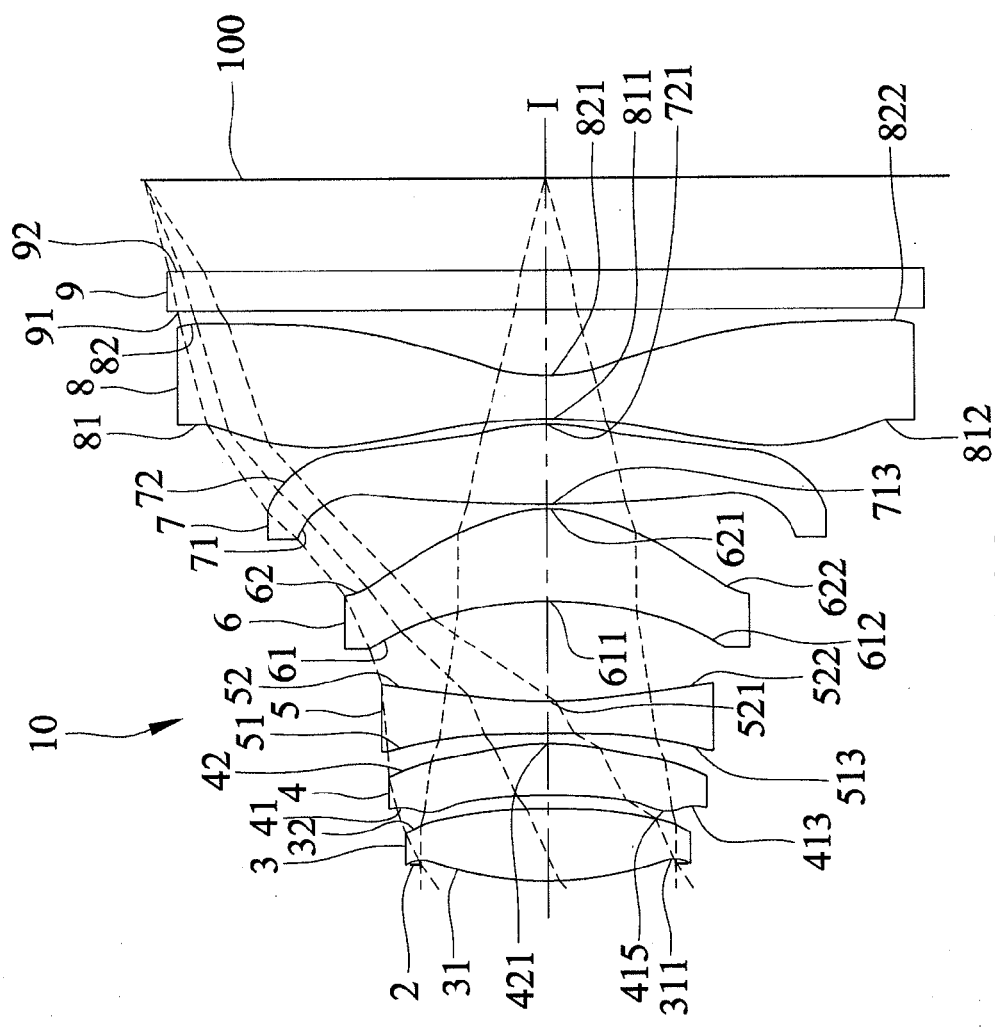
FIG. 22 is a schematic diagram that illustrates the sixth preferred embodiment of an imaging lens according to the present invention.

Referring to FIG. 22, the differences between the first and sixth preferred embodiments of the imaging lens 10 of this invention reside in that: the object-side surface 31 of the first lens element 3 has a concave portion 311 in a vicinity of a periphery of the first lens element 3; the object-side surface 41 of the second lens element 4 has a concave portion 413 in a vicinity of a periphery of the second lens element 4, and a convex portion 415 between a concave optical axis portion thereof and the concave portion 413; the object-side surface 51 of the third lens element 5 has a concave portion 513 in a vicinity of a periphery of the third lens element 5; and the object-side surface 71 of the fifth lens element 7 has a convex portion 713 in a vicinity of the optical axis (I).

Shown in FIG. 23 is a table that lists values of some optical parameters corresponding to the surfaces 31-91, 32-92 of the sixth preferred embodiment. The imaging lens 10 has an overall system focal length of 3.911 mm, an HFOV of 38.320°, an F-number of 2.008, and a system length of 5.353 mm.

Shown in FIG. 24 is a table that lists values of some optical parameters of the aforementioned optical relationship (1) corresponding to the sixth preferred embodiment.

Relationships among some of the aforementioned optical parameters corresponding to the sixth preferred embodiment are as follows:

TTL=5.352

ALT=3.117

$(T1+T3+T4+T5+T6)/T2=6.317$ $(T1+T2+T3+T4+T6)/T5=3.711$ $(G12+G23+G45+G56)/T2=0.694$

ALT/$T5$=5.212

TTL/$T5$=8.950

ALT/$G34$=4.075

TTL/$T4$=7.668

Figure 25:
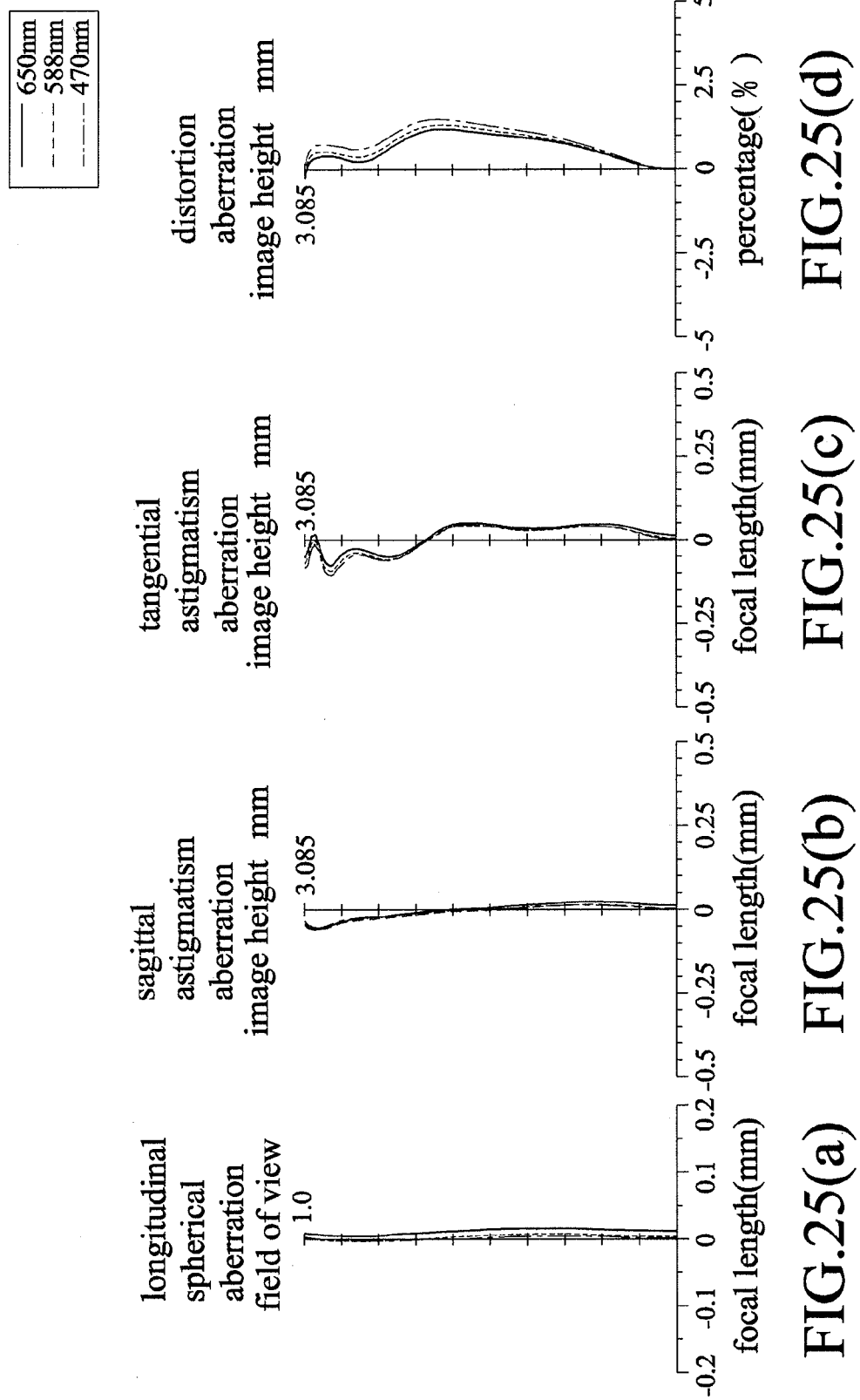
FIGS. 25(a) to 25(d) show different optical characteristics of the imaging lens of the sixth preferred embodiment.

FIGS. 25(*a*) to 25(*d*) respectively show simulation results corresponding to longitudinal spherical aberration, sagittal astigmatism aberration, tangential astigmatism aberration, and distortion aberration of the sixth preferred embodiment. It can be understood from FIGS. 25(*a*), 25(*b*), 25(*c*) and 25(*d*) that the sixth preferred embodiment is able to achieve a relatively good optical performance.

Figure 26:
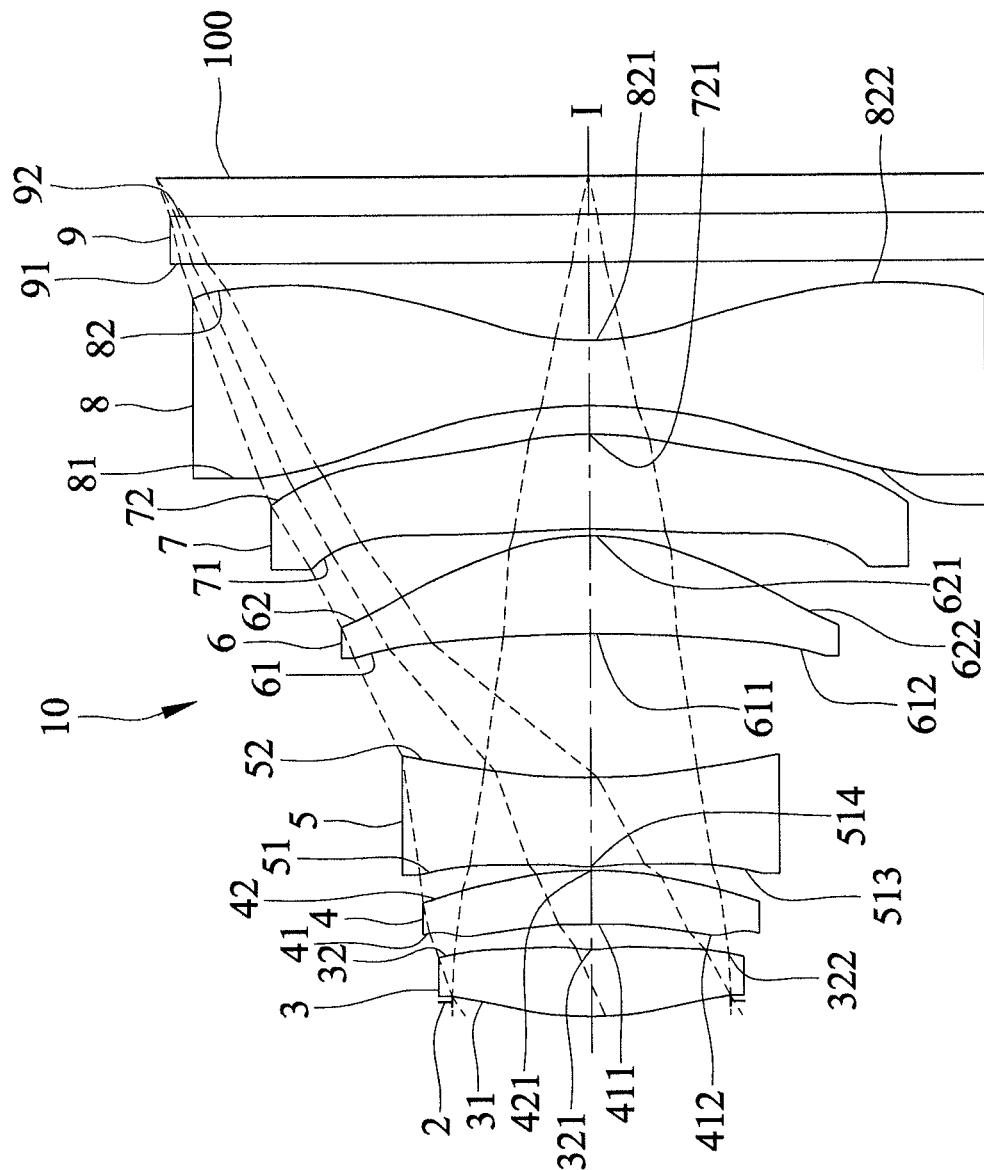
FIG. 26 is a schematic diagram that illustrates the seventh preferred embodiment of an imaging lens according to the present invention.

Referring to FIG. 26, the differences between the first and seventh preferred embodiments of the imaging lens 10 of this invention reside in that: the image-side surface 32 of the first lens element 3 has a concave portion 321 in a vicinity of the optical axis (I), and a convex portion 322 in a vicinity of a periphery of the first lens element 3; the object-side surface 51 of the third lens element 5 has a convex portion 514 in a vicinity of the optical axis (I), and a concave portion 513 in a vicinity of a periphery of the third lens element 5; and the object-side surface 81 of the sixth lens element 8 is a concave surface that has a concave portion 813 in a vicinity of a periphery of the sixth lens element 8.

Shown in FIG. 27 is a table that lists values of some optical parameters corresponding to the surfaces 31-91, 32-92 of the seventh preferred embodiment. The imaging lens 10 has an overall system focal length of 3.889 mm, an HFOV of 36.710°, an F-number of 2.211, and a system length of 5.301 mm.

Shown in FIG. 28 is a table that lists values of some optical parameters of the aforementioned optical relationship (1) corresponding to the seventh preferred embodiment.

Relationships among some of the aforementioned optical parameters corresponding to the seventh preferred embodiment are as follows:

TTL=5.302

ALT=3.242

$(T1+T3+T4+T5+T6)/T2=7.653$ $(T1+T2+T3+T4+T6)/T5=3.928$ $(G12+G23+G45+G56)/T2=1.194$

ALT/$T5$=5.430

TTL/$T5$=8.881

ALT/$G34$=3.555

TTL/$T4$=8.552

Figure 29:
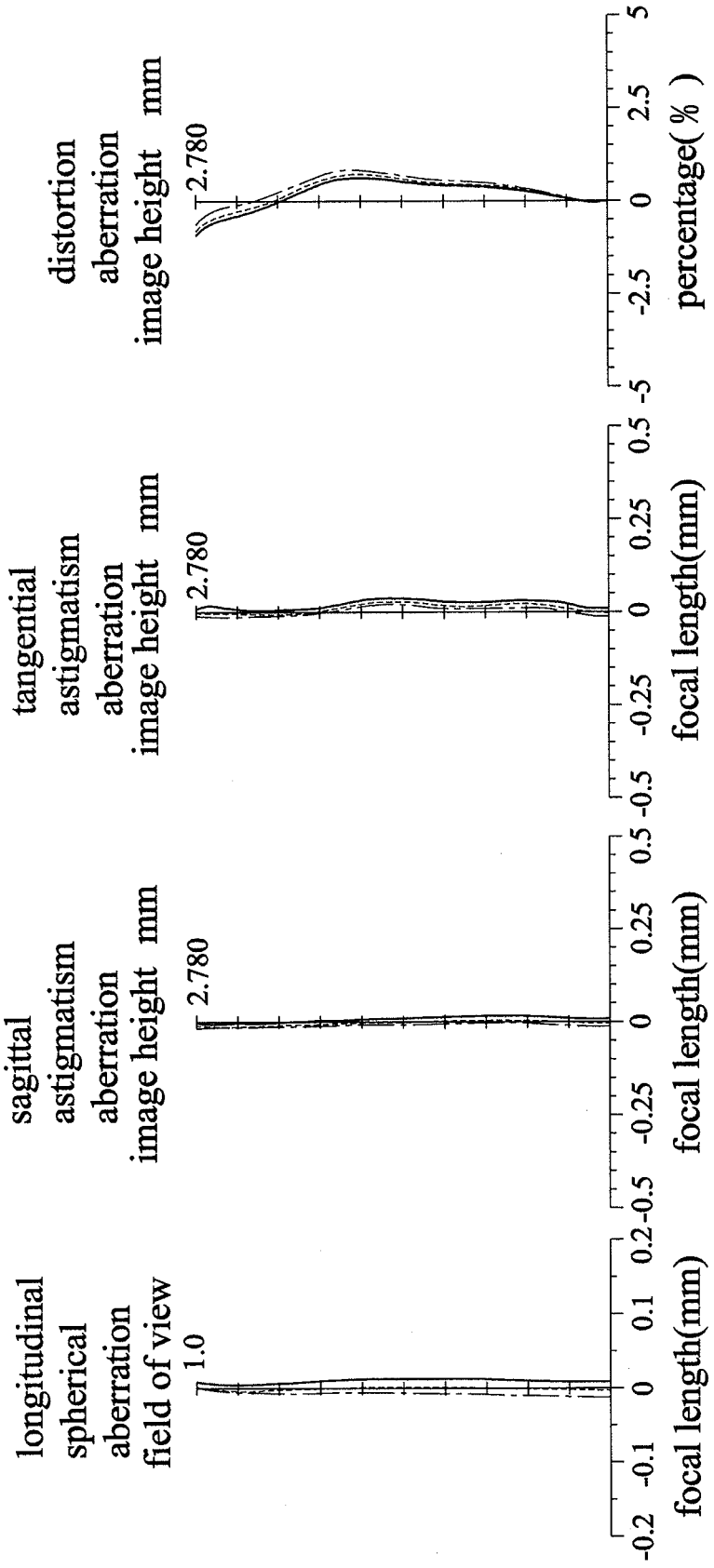
FIGS. 29(a) to 29(d), show different optical characteristics of the imaging lens of the seventh preferred embodiment.

FIGS. 29(*a*) to 29(*d*) respectively show simulation results corresponding to longitudinal spherical aberration, sagittal astigmatism aberration, tangential astigmatism aberration, and distortion aberration of the seventh preferred embodiment. It can be understood from FIGS. 29(*a*), 29(*b*), 29(*c*) and 29(*d*) that the seventh preferred embodiment is able to achieve a relatively good optical performance.

Figure 30:
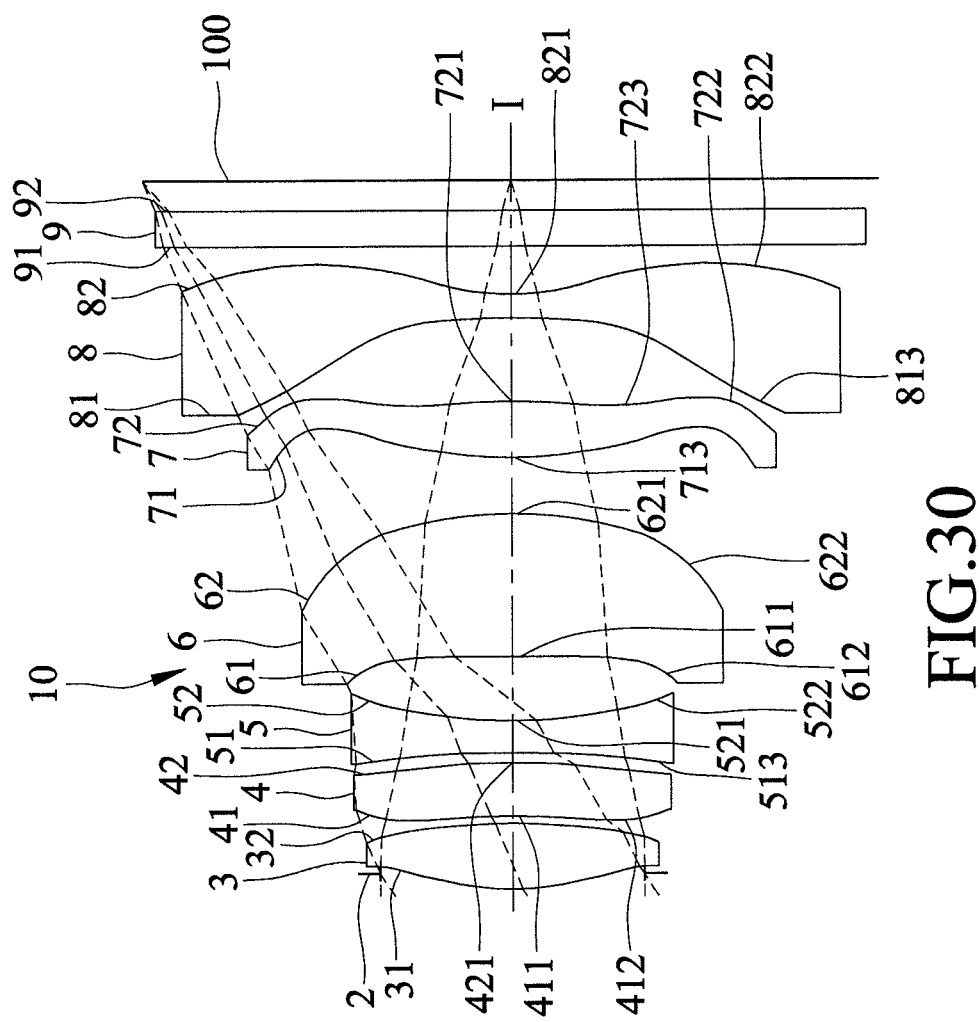
FIG. 30 is a schematic diagram that illustrates the eighth preferred embodiment of an imaging lens according to the present invention.

Referring to FIG. 30, the differences between the first and eighth preferred embodiments of the imaging lens 10 of this invention reside in that: the object-side surface 51 of the third lens element 5 has a concave portion 513 in a vicinity of a periphery of the third lens element 5; the object-side surface 71 of the fifth lens element 7 has a convex portion 713 in a vicinity of the optical axis (I), and the image-side surface 72 of the fifth lens element 7 has a concave portion 723 between an convex optical axis portion 721 thereof and a convex periphery portion 722 thereof; and the object-side surface 81 of the sixth lens element 8 is a concave surface that has a concave portion 813 in a vicinity of a periphery of the sixth lens element 8.

Shown in FIG. 31 is a table that lists values of some optical parameters corresponding to the surfaces 31-91, 32-92 of the eighth preferred embodiment. The imaging lens 10 has an overall system focal length of 4.405 mm, an HFOV of 35.699°, an F-number of 2.007, and a system length of 5.904 mm.

Shown in FIG. 32 is a table that lists values of some optical parameters of the aforementioned optical relationship (1) corresponding to the eighth preferred embodiment.

Relationships among some of the aforementioned optical parameters corresponding to the eighth preferred embodiment are as follows:

TTL=5.940

ALT=3.414

$(T1+T3+T4+T5+T6)/T2=5.889$ $(T1+T2+T3+T4+T6)/T5=5.611$ $(G12+G23+G45+G56)/T2=2.936$

ALT/$T5$=7.248

TTL/$T5$=12.611

ALT/$G34$=6.253

TTL/$T4$=5.017

Figure 33:
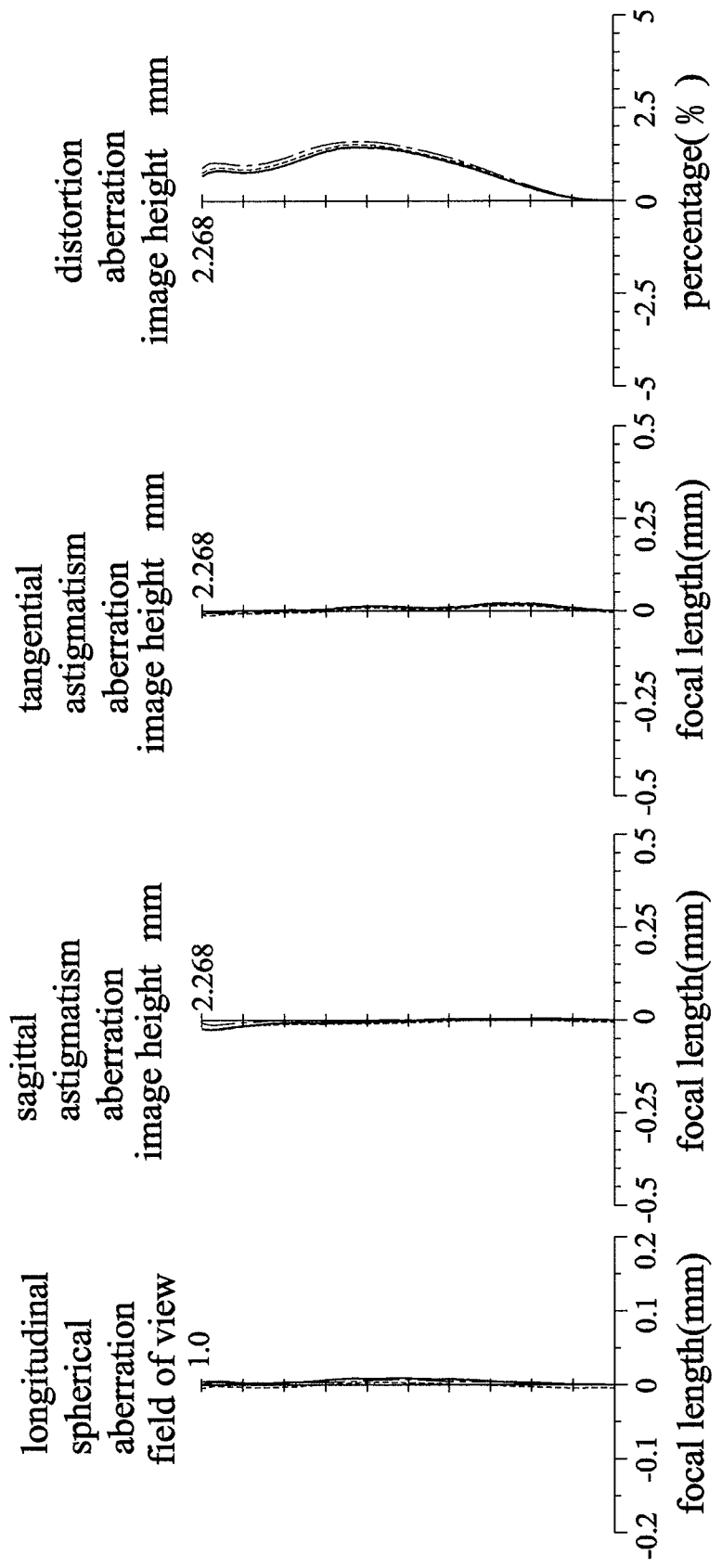
FIGS. 33(a) to 33(d) show different optical characteristics of the imaging lens of the eighth preferred embodiment.

FIGS. 33(*a*) to 33(*d*) respectively show simulation results corresponding to longitudinal spherical aberration, sagittal astigmatism aberration, tangential astigmatism aberration, and distortion aberration of the eighth preferred embodiment. It can be understood from FIGS. 33(*a*), 33(*b*), 33(*c*) and 33(*d*) that the eighth preferred embodiment is able to achieve a relatively good optical performance.

Shown in FIG. 34 is a table that lists the aforesaid relationships among some of the aforementioned optical parameters corresponding to the eight preferred embodiments for comparison. When each of the optical parameters of the imaging lens 10 according to this invention satisfies the following optical relationships, the optical performance is still relatively good even with the reduced system length, so that application of the present invention to portable electronic devices may contribute to thickness reduction of the devices.

(1) When (G12+G23+G45+G56)/T2≤3.0, a sum of G12, G23, G45 and G56 has a relatively large reducible ratio compared to T2, which may effectively contribute to reduction of the overall dimension of the imaging lens 10, thereby favoring miniaturization. Preferably, 0.5≤(G12+G23+G45+G56)/T2≤3.0.

(2) When ALT/T5 is greater than 4.0, T5 has a relatively large reducible ratio compared to ALT, which may effectively contribute to reduction of the overall system length of the imaging lens 10, thereby favoring miniaturization. Preferably, 4.0≤ALT/T5≤12.0.

(3) TTL/T5≥6.8: Since the fifth lens element 7 usually has a relatively large effective optical radius, T5 may be made thicker. Reduction of T5 favors reducing system length of the imaging lens 10. When this relationship is satisfied, T5 has a relatively large reducible ratio compared to TTL, which may effectively contribute to reduction of the overall system length of the imaging lens 10, thereby favoring miniaturization. Preferably, 6.8≤TTL/T5≤21.0.

(4) When (T1+T2+T3+T4+T6)/T5≥2.8, T5 has a relatively large reducible ratio compared to T1, T2, T3, T4 and T6, which may contribute to reduction of the system length while maintaining image quality. Preferably, 2.8≤(T1+T2+T3+T4+T6)/T5≤10.0.

(5) When (T1+T3+T4+T5+T6)/T2≤9.3, a sum of T1, T3, T4, T5 and T6 has a relatively large reducible ratio compared to T2, which may effectively contribute to reduction of the overall system length of the imaging lens 10, thereby favoring miniaturization. Preferably, 5.0≤(T1+T3+T4+T5+T6)/T2≤9.3.

(6) When TTL/T4≤20.0, T4 has a relatively small reducible ratio compared to TTL. Considering optical properties and manufacturing ability, better arrangement may be achieved when this relationship is satisfied. Preferably, 5.0≤TTL/T4≤20.0.

(7) When ALT/G34≤5.3, G34 has a relatively small reducible ratio compared to ALT, so as to maintain a better distance between the third lens element 5 and the fourth lens element 6, thereby achieving good image quality. Preferably, 3.5≤ALT/G34≤5.3.

To sum up, effects and advantages of the imaging lens 10 according to the present invention are described hereinafter.

1. By virtue of the convex portions 421, the convex portion 721, or the concave portion 811, optical aberration of images may be corrected. Since the lens elements 3-8 are made of a plastic material, weight and cost of the imaging lens 10 may be reduced.

2. Through design of the relevant optical parameters, such as (T1+T3+T4+T5+T6)/T2, (T1+T2+T3+T4+T6)/T5, (G12+G23+G45+G56)/T2, ALT/T5, TTL/T5, ALT/G34, and TTL/T4, optical aberrations, such as spherical aberration, may be reduced or even eliminated. Further, through surface design and arrangement of the lens elements 3-8, even with the system length reduced, optical aberrations may still be reduced or even eliminated, resulting in relatively good optical performance.

3. Through the aforesaid eight preferred embodiments, it is known that the system length of this invention may be reduced down to below 6 mm, so as to facilitate developing thinner relevant products with economic benefits.

Figure 35:
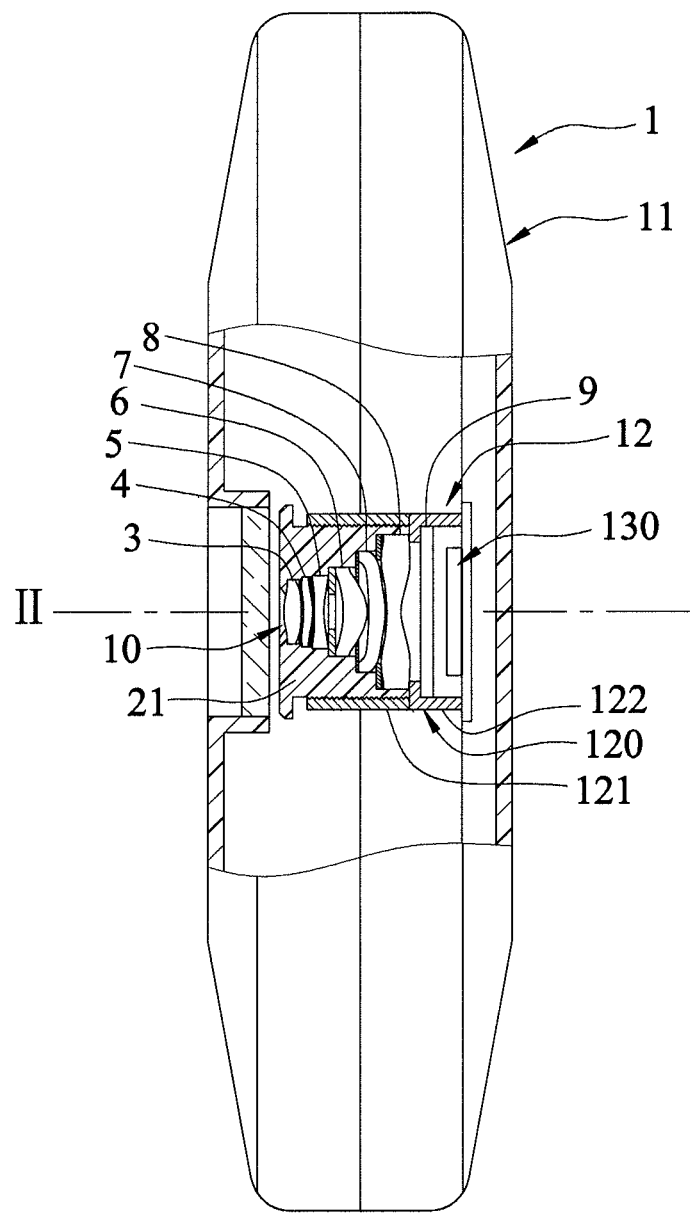
FIG. 35 is a schematic partly sectional view to illustrate a first exemplary application of the imaging lens of the present invention.

Shown in FIG. 35 is a first exemplary application of the imaging lens 10, in which the imaging lens 10 is disposed in a housing 11 of an electronic apparatus 1 (such as a mobile phone, but not limited thereto), and forms a part of an imaging module 12 of the electronic apparatus 1. The imaging module 12 includes a barrel 21 on which the imaging lens 10 is disposed, a holder unit 120 on which the barrel 21 is disposed, and an image sensor 130 disposed at the image plane 100 (see FIG. 2).

The holder unit 120 includes a first holder portion 121 in which the barrel 21 is disposed, and a second holder portion 122 having a portion interposed between the first holder portion 121 and the image sensor 130. The barrel 21 and the first holder portion 121 of the holder unit 120 extend along an axis (II), which coincides with the optical axis (I) of the imaging lens 10.

Figure 36:
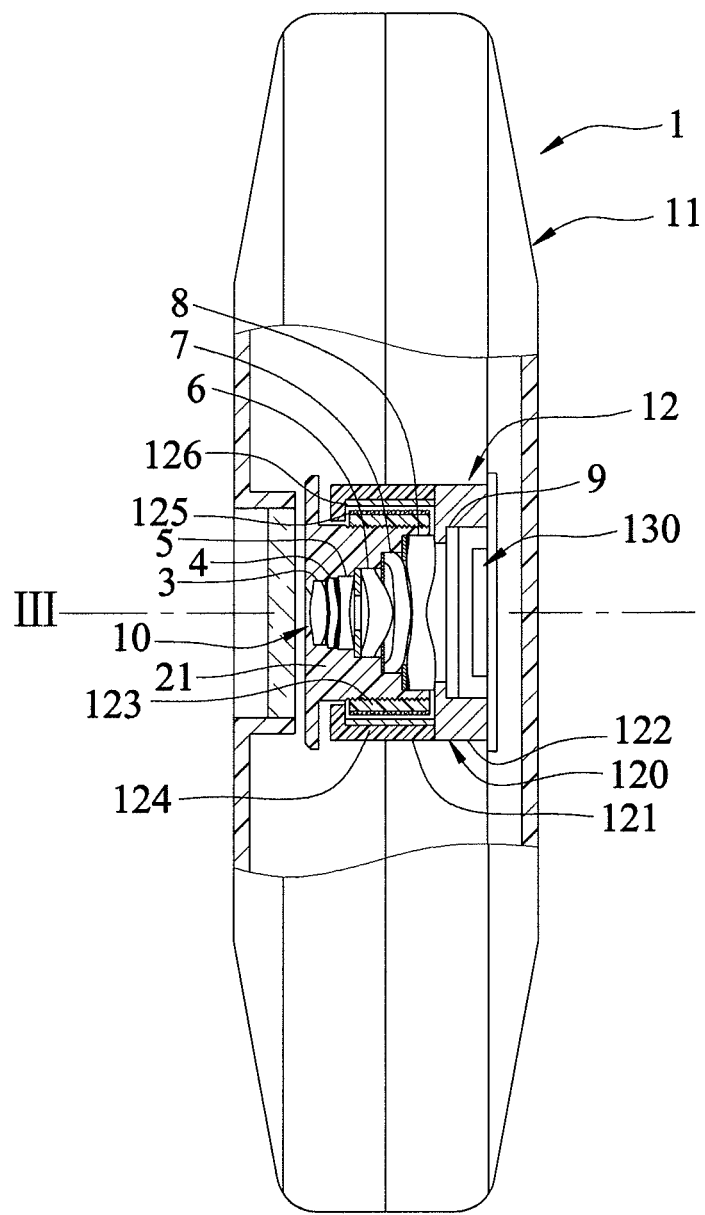
FIG. 36 is a schematic partly sectional view to illustrate a second exemplary application of the imaging lens of the present invention.

Shown in FIG. 36 is a second exemplary application of the imaging lens 10. The differences between the first and second exemplary applications reside in that, in the second exemplary application, the holder unit 120 is configured as a voice-coil motor (VCM), and the first holder portion 121 includes an inner section 123 in which the barrel 21 is disposed, an outer section 124 that surrounds the inner section 123, a coil 125 that is interposed between the inner and outer sections 123, 124, and a magnetic component 126 that is disposed between an outer side of the coil 125 and an inner side of the outer section 124.

The inner section 123 and the barrel 21, together with the imaging lens 10 therein, are movable with respect to the image sensor 130 along an axis (III), which coincides with the optical axis (I) of the imaging lens 10. The optical filter 9 of the imaging lens 10 is disposed at the second holder portion 122, which is disposed to abut against the outer section 124. Configuration and arrangement of other components of the electronic apparatus 1 in the second exemplary application are identical to those in the first exemplary application, and hence will not be described hereinafter for the sake of brevity.

By virtue of the imaging lens 10 of the present invention, the electronic apparatus 1 in each of the exemplary applications may be configured to have a relatively reduced overall thickness with good optical and imaging performance, so as to reduce cost of materials, and satisfy requirements of product miniaturization.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An imaging lens comprising a first lens element, a second lens element, a third lens element, a fourth lens element, a fifth lens element and a sixth lens element arranged in order from an object side to an image side along an optical axis of said imaging lens, each of said first lens element, said second lens element, said third lens element, said fourth lens element, said fifth lens element and said sixth lens element having a refractive power, and having an object-side surface facing toward the object side and an image-side surface facing toward the image side, wherein:

the refractive power of said first lens element is positive;

said object-side surface of said second lens element has a concave portion in a vicinity of the optical axis, and said image-side surface of said second lens element has a convex portion in a vicinity of the optical axis;

the refractive power of said third lens element is negative, and said image-side surface of said third lens element has a concave portion in a vicinity of the optical axis;

the refractive power of said fourth lens element is positive, said object-side surface of said fourth lens element has a concave portion in a vicinity of the optical axis, said image-side surface of said fourth lens element having a convex portion in a vicinity of the optical axis; and said image-side surface of said sixth lens element has a concave portion in a vicinity of the optical axis, and a convex portion in a vicinity of a periphery of said sixth lens element, wherein said object-side surface of said sixth lens element has a concave portion in a vicinity of the optical axis;

wherein said imaging lens does not include any lens element with refractive power other than said first lens element, said second lens element, said third lens element, said fourth lens element, said fifth lens element and said sixth lens element.

2. The imaging lens as claimed in claim 1, satisfying (G12+G23+G45+G56)/T2≤3.0, where G12 represents a distance between said image-side surface of said first lens element and said object-side surface of said second lens element at the optical axis; G23 represents a distance between said image-side surface of said second lens element and said object-side surface of said third lens element at the optical axis; G45 represents a distance between said image-side surface of said fourth lens element and said object-side surface of said fifth lens element at the optical axis; G56 represents a distance between said image-side surface of said fifth lens element and said object-side surface of said sixth lens element at the optical axis; and T2 represents a distance between said object-side surface and said image-side surface of said second lens element at the optical axis.

3. The imaging lens as claimed in claim 2, further satisfying ALT/T5≥4.0, where ALT represents a sum of a distance between said object-side surface and said image-side surface of said first lens element at the optical axis, the distance between said object-side surface and said image-side surface of said second lens element at the optical axis, a distance between said object-side surface and said image-side surface of said third lens element at the optical axis, a distance between said object-side surface and said image-side surface of said fourth lens element at the optical axis, a distance between said object-side surface and said image-side surface of said fifth lens element at the optical axis, and a distance between said object-side surface and said image-side surface of said sixth lens element at the optical axis; and T5 represents the distance between said object-side surface and said image-side surface of said fifth lens element at the optical axis.

4. The imaging lens as claimed in claim 1, satisfying TTL/T5≥6.8, where TTL represents a distance between said object-side surface of said first lens element and an image plane at the image side of said imaging lens at the optical axis; and T5 represents a distance between said object-side surface and said image-side surface of said fifth lens element at the optical axis.

5. The imaging lens as claimed in claim 4, further satisfying (G12+G23+G45+G56)/T2≤3.0, where G12 represents a distance between said image-side surface of said first lens element and said object-side surface of said second lens element at the optical axis; G23 represents a distance between said image-side surface of said second lens element and said object-side surface of said third lens element at the optical axis; G45 represents a distance between said image-side surface of said fourth lens element and said object-side surface of said fifth lens element at the optical axis; G56 represents a distance between said image-side surface of said fifth lens element and said object-side surface of said sixth lens element at the optical axis; and T2 represents a distance between said object-side surface and said image-side surface of said second lens element at the optical axis.

6. The imaging lens as claimed in claim 1, satisfying (T1+T2+T3+T4+T6)/T5≥2.8, where T1 represents a distance between said object-side surface and said image-side surface of said first lens element at the optical axis; T2 represents a distance between said object-side surface and said image-side surface of said second lens element at the optical axis; T3 represents a distance between said object-side surface and said image-side surface of said third lens element at the optical axis; T4 represents a distance between said object-side surface and said image-side surface of said fourth lens element at the optical axis; T5 represents a distance between said object-side surface and said image-side surface of said fifth lens element at the optical axis; and T6 represents a distance between said object-side surface and said image-side surface of said sixth lens element at the optical axis.

7. The imaging lens as claimed in claim 6, further satisfying (G12+G23+G45+Gp6)/T2≤3.0, where G12 represents a distance between said image-side surface of said first lens element and said object-side surface of said second lens element at the optical axis; G23 represents a distance between said image-side surface of said second lens element and said object-side surface of said third lens element at the optical axis; G45 represents a distance between said image-side surface of said fourth lens element and said object-side surface of said fifth lens element at the optical axis; and G56 represents a distance between said image-side surface of said fifth lens element and said object-side surface of said sixth lens element at the optical axis.

8. The imaging lens as claimed in claim 7, wherein said image-side surface of said fifth lens element has a convex portion in a vicinity of the optical axis.

9. The imaging lens as claimed in claim 1, satisfying (T1+T3+T4+T5+T6)/T2≤9.3, where T1 represents a distance between said object-side surface and said image-side surface of said first lens element at the optical axis; T2 represents a distance between said object-side surface and said image-side surface of said second lens element at the optical axis; T3 represents a distance between said object-side surface and said image-side surface of said third lens element at the optical axis; T4 represents a distance between said object-side surface and said image-side surface of said fourth lens element at the optical axis; T5 represents a distance between said object-side surface and said image-side surface of said fifth lens element at the optical axis; and T6 represents a distance between said object-side surface and said image-side surface of said sixth lens element at the optical axis.

10. The imaging lens as claimed in claim 1, satisfying TTL/T4≥20.0, where TTL represents a distance between said object-side surface of said first lens element and an image plane at the image side of said imaging lens at the optical axis; and T4 represents a distance between said object-side surface and said image-side surface of said fourth lens element at the optical axis, and the refractive power of said second lens element is positive.

11. The imaging lens as claimed in claim 10, further satisfying (T1+T2+T3+T4+T6)/T5≥2.8, where T1 represents a distance between said object-side surface and said image-side surface of said first lens element at the optical axis; T2 represents a distance between said object-side surface and said image-side surface of said second lens element at the optical axis; T3 represents a distance between said object-side surface and said image-side surface of said third lens element at the optical axis; T5 represents a distance between said object-side surface and said image-side surface of said fifth lens element at the optical axis; and T6 represents a distance between said object-side surface and said image-side surface of said sixth lens element at the optical axis.

12. The imaging lens as claimed in claim 11, further satisfying (G12+G23+G45+G56)/T2≤3.0, where G12 represents a distance between said image-side surface of said first lens element and said object-side surface of said second lens element at the optical axis; G23 represents a distance between said image-side surface of said second lens element and said object-side surface of said third lens element at the optical axis; G45 represents a distance between said image-side surface of said fourth lens element and said object-side surface of said fifth lens element at the optical axis; and G56 represents a distance between said image-side surface of said fifth lens element and said object-side surface of said sixth lens element at the optical axis.

13. The imaging lens as claimed in claim 1, wherein said image-side surface of said fifth lens element has a convex portion in a vicinity of the optical axis.

14. The imaging lens as claimed in claim 13, satisfying: ALT/G34≥5.3, where ALT represents a sum of a distance between said object-side surface and said image-side surface of said first lens element at the optical axis, a distance between said object-side surface and said image-side surface of said second lens element at the optical axis, a distance between said object-side surface and said image-side surface of said third lens element at the optical axis, a distance between said object-side surface and said image-side surface of said fourth lens element at the optical axis, a distance between said object-side surface and said image-side surface of said fifth lens element at the optical axis, and a distance between said object-side surface and said image-side surface of said sixth lens element at the optical axis; and G34 represents a distance between said image-side surface of said third lens element and said object-side surface of said fourth lens element at the optical axis.

15. An electronic apparatus comprising:
a housing; and
an imaging module disposed in said housing, and including an imaging lens as claimed in claim 1, a barrel on which said imaging lens is disposed, a holder unit on which said barrel is disposed, and an image sensor disposed at the image side of said imaging lens.

* * * * *